US012762490B2

(12) United States Patent
Prescott et al.

(10) Patent No.: US 12,762,490 B2
(45) **Date of Patent: *Oct. 13, 2026**

(54) SYSTEMS AND METHODS FOR CREATING AND MANAGING A LOOKAHEAD SCHEDULE

(71) Applicant: Procore Technologies, Inc., Carpinteria, CA (US)

(72) Inventors: Luke Evan Prescott, Ojai, CA (US); Jake Geller, Ventura, CA (US)

(73) Assignee: Procore Technologies, Inc., Carpinteria, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/890,240

(22) Filed: Sep. 19, 2024

(65) Prior Publication Data

US 2025/0086544 A1 Mar. 13, 2025

Related U.S. Application Data

(63) Continuation of application No. 17/682,663, filed on Feb. 28, 2022, now Pat. No. 12,099,946, which is a (Continued)

(51) Int. Cl.
*G06Q 10/06* (2023.01)
*G06Q 10/0631* (2023.01)

(52) U.S. Cl.
CPC ................ *G06Q 10/06314* (2013.01); *G06Q 10/063118* (2013.01); *G06Q 10/06312* (2013.01); *G06Q 10/06313* (2013.01); *G06Q 10/06315* (2013.01)

(58) Field of Classification Search
CPC .................................................. G06Q 10/063
See application file for complete search history.

(56) References Cited

U.S. PATENT DOCUMENTS 7,499,453 B2 * 3/2009 Carlson .................. H04L 47/29 370/395.2
7,813,993 B1 * 10/2010 Barto .................... G06Q 40/00 705/37

(Continued)

FOREIGN PATENT DOCUMENTS

JP 2002-140389 A 5/2002
KR 10-0968708 B1 7/2010

(Continued)

OTHER PUBLICATIONS

Glenn Ballard, Lookahead Planning: The Missing Link in Production Control, University of California at Berkeley, USA, May 7, 2018. (Year: 2018).*

(Continued)

*Primary Examiner* — Kurtis Gills
(74) *Attorney, Agent, or Firm* — Lee Sullivan Shea & Smith LLP

(57) ABSTRACT

Disclosed herein is new software technology for creating and managing a lookahead schedule for a construction project. In one aspect, disclosed herein is a method that involves (1) receiving, from a client station, a request to create an initial lookahead schedule for a project, where the request comprises timeline information for the initial lookahead schedule, (2) after receiving the request, creating the initial lookahead schedule based on the timeline information and a previously-created master schedule for the project, and (3) causing the client station to present a user-interface view that provides a representation of the initial lookahead schedule.

20 Claims, 11 Drawing Sheets

Related U.S. Application Data continuation of application No. 16/878,339, filed on May 19, 2020, now Pat. No. 11,263,565.

(56) References Cited

U.S. PATENT DOCUMENTS

| | | | | |
|---|---|---|---|---|
| 10,510,029 | B2 * | 12/2019 | Sun | H02J 3/00 |
| 10,783,468 | B2 | 9/2020 | Sanger | |
| 2002/0078236 | A1 * | 6/2002 | Mar | H04L 67/61 709/238 |
| 2005/0004826 | A1 | 1/2005 | Chen et al. | |
| 2005/0160084 | A1 * | 7/2005 | Barrett | G06Q 10/06 |
| 2005/0222881 | A1 * | 10/2005 | Booker | G06Q 10/06375 705/7.38 |
| 2008/0262890 | A1 * | 10/2008 | Korupolu | G06F 11/0793 705/7.22 |
| 2010/0017740 | A1 | 1/2010 | Gonzalez Veron et al. | |
| 2010/0318392 | A1 * | 12/2010 | Cassels | G06Q 10/0631 705/7.23 |
| 2012/0047420 | A1 | 2/2012 | Gaffey et al. | |
| 2012/0215574 | A1 * | 8/2012 | Driessnack | G06Q 10/0639 705/7.12 |
| 2014/0278639 | A1 * | 9/2014 | MacGillivray | G06Q 10/06311 705/7.15 |
| 2019/0325089 | A1 * | 10/2019 | Golparvar-Fard | G06T 19/003 |
| 2020/0226305 | A1 * | 7/2020 | Trivelpiece | G06F 30/20 |
| 2020/0233662 | A1 * | 7/2020 | Bissonette | G06Q 10/0635 |

FOREIGN PATENT DOCUMENTS

| | | | | |
|---|---|---|---|---|
| KR | 10-2013-0040436 A | 4/2013 | | |
| WO | WO-2009088617 A1 * | 7/2009 | | H04L 41/0654 |

OTHER PUBLICATIONS

"Procore & ProjectControls. online", ProjectControls. online, https://marketplace.procore.com/apps/projectcontrolsonline, retrieved from the Internet on May 19, 2020, 2 pages.

"Grit Virtual", Procore App Marketplace, https://marketplace.procore.com/apps/grit-virtual, retrieved from the Internet on May 19, 2020, 2 pages.

"The Standard for Planning and Scheduling", Oracle's Primavera P6 Enterprise Project Portfolio Management, Oracle, https://www.oracle.com/industries/construction-engineering/primavera-p6, retrieved from the Internet on May 19, 2020, 6 pages.

"Project Management Software", Microsoft Project, https://www.microsoft.com/en-us/microsoft-365/project/project-management-software, retrieved from the Internet on May 19, 2020, 5 pages.

"Manage Excel Templates", Create and Deploy Excel Templates (Dynamics 365 Marketing) Microsoft Docs, https://docs.microsoft.com/en-us/dynamics365/marketing/manage-excel-templates, retrieved from the Internet on May 19, 2020, 9 pages.

"Using Fieldwire to Support Last Planner System", Fieldwire, https://www.fieldwire.com/blog/3-ways-fieldwire-supports-last-planner-system-implementation, Oct. 13, 2017, retrieved from the Internet on May 19, 2020, 4 pages.

"Construction Project Management Software", Buildertrend, https://buildertrend.com/how-it-works/features/project-management, retrieved from the Internet on May 19, 2020, 11 pages.

"Construction Scheduling Software for Subcontractors", ESUB Construction Software, https://esub.com/esub-scheduling-construction-software, retrieved from the Internet on May 19, 2020, 14 pages.

International Searching Authority, International Search Report and Written Opinion, PCT International Application No. PCT/US2021/033252, Sep. 16, 2021, 10 pages.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

Ballard, Glenn, "Lookahead Planning: The Missing Link in Production Control", IGLC-5 Proceedings, University of California at Berkeley, USA, May 7, 2018, pp. 13-25.

* cited by examiner

601

800

SYSTEMS AND METHODS FOR CREATING AND MANAGING A LOOKAHEAD SCHEDULE

CROSS-REFERENCE TO RELATED APPLICATION

This application is a continuation of U.S. patent application Ser. No. 17/682,663, filed on Feb. 28, 2022, and titled "Systems and Methods for Creating and Managing a Lookahead Schedule," which is a continuation of U.S. patent application Ser. No. 16/878,339, filed on May 19, 2020, and titled "Systems and Methods for Creating and Managing a Lookahead Schedule," each of which is incorporated by reference herein in its entirety.

BACKGROUND

Construction projects can be massive endeavors involving multiple different parties. For instance, there may be a client who is funding the project, a general contractor ("GC") who manages the overall construction project, and numerous subcontractors ("SC") who provide goods and/or services to the GC to complete the project. Typically, a client may enter into a "prime contract" with a GC that outlines a scope of the construction project and the fees that the client will pay to the GC. In turn, a GC may enter into subcontracts with various different subcontractors to work on various different aspects of the construction project. For example, a GC may engage a first SC to handle a first aspect of the construction project (e.g., provide goods and/or services for concrete work), a second SC to handle a second aspect of the construction project (e.g., provide goods and/or services for carpentry work), and so on.

Generally speaking, the GC's primary responsibility is to complete the project on time and on budget while meeting the client's requirements. To accomplish this, the GC must create multiple different schedules that may each comprise planned dates for performing tasks that need to be completed for the project, resources (e.g., materials, labor, equipment, etc.) required to perform the tasks, and/or for meeting deliverables required by the client. Creating and managing these different types of project schedules efficiently plays a key role in any project's success.

OVERVIEW

One type of schedule that may be created for a construction project is known as a master schedule. A "master schedule" typically provides a summary-level schedule of a construction project, which may include a timeline for project deliverables, project milestones, and completing a list of tasks (e.g., high-level tasks) for the project. In this respect, the master schedule of a construction project may take various forms.

For instance, the master schedule of a construction project may take the form of a Gantt chart, which is a type of bar chart that may include a planned start date and a planned finish date of each high-level task for the project, one or more resources assigned to each high-level task (e.g., materials, labor, equipment, etc.), and any dependencies between two given tasks (for instances where the completion of one given task depends on the completion of another given task). In particular, for each high-level task, the Gantt chart may include a horizontal bar with a given length that represents the planned duration to complete the high-level task, the start date and the finish date for the high-level task, and/or an indication of how much progress has been made in completing the high-level task.

Further, in some instances, the high-level tasks included in the master schedule may comprise critical path tasks and/or non-critical path tasks. A "critical path" task may be a task that needs to be completed on time in accordance with the planned finish date for the task in order to guarantee that the GC will complete the project by the project's deadline, whereas a "non-critical path" task may be a task that can be delayed for a given period of time without negatively impacting the project's deadline.

The master schedule of a construction project may take various other forms as well.

Generally speaking, the master schedule of a construction project may help the GC schedule, manage, and keep track of high-level tasks and resources (e.g., materials, labor, equipment, etc.) for the construction project. The master schedule may also help an individual associated with the GC (e.g., a project manager employed by the GC) to communicate high-level project status to the client to reassure the client that the project will be completed on time and on budget.

However, the master schedule can be complex yet may not provide the level of detail needed to track tasks that need to be completed by construction workers (e.g., field workers employed by the GC and/or a given SC) on a day-to-day basis in order to ensure that the project is completed on time and on budget. In fact, the master schedule provides a summary-level schedule of the construction project that may not include more granular-level subtasks that need to be performed by construction workers on a day-to-day basis because it may not be feasible to capture such level of detail in a master schedule at the beginning of a construction project, and the master schedule typically only gets updated once or twice a month. As such, the master schedule may not always provide construction workers with the most up-to-date schedule and may not provide a more detailed schedule that can be used on the field to manage and track day-to-day operations for the construction project.

In view of the foregoing, another type of schedule that may be created for a construction project is known as a lookahead schedule. A "lookahead schedule" is a detailed schedule that summarizes the upcoming weeks (e.g., the upcoming 1 to 6 weeks) of the construction project and provides more granular-level tasks and/or subtasks that need to be completed by construction workers on a day-to-day basis for one or more upcoming weeks. Typically, a new version of the lookahead schedule may be created every 1 to 2 weeks, and as the project progresses, the latest version of the lookahead schedule may be used to update the master schedule to ensure that both schedules are in line with each other. In this respect, a lookahead schedule can be a useful tool for updating the master schedule and for managing and keeping track of resources and tasks that need to be completed each day of the week for the construction project.

The lookahead schedule for a construction project may take various forms. For instance, the lookahead schedule may take the form of a Gantt chart similar to the Gantt chart of a master schedule, but the lookahead schedule may provide a more detailed look at the granular-level tasks and/or subtasks that need to be performed on a day-to-day basis over a shorter timeline (e.g., the upcoming 1 to 2 weeks, 1 to 3 weeks, etc.) and include one or more resources (e.g., materials, labor, equipment, etc.) assigned to each subtask.

The lookahead schedule for a construction project may take various other forms as well.

In practice, different individuals may be responsible for creating and/or managing a master schedule and eating and/or managing a lookahead schedule for a construction project. For instance, a project manager employed by a GC may be responsible for (1) creating and/or managing the master schedule for the construction project, (2) communicating with the owner of the project to ensure that the project will be completed on time and on budget, and (3) informing construction workers (e.g., construction workers employed by the GC or SCs) of the upcoming tasks that need to be completed. In turn, a superintendent employed by the GC may be responsible for coordinating with construction workers (e.g., construction workers employed by the GC or SCs) to create and/or manage a lookahead schedule for the construction project.

While software applications exist that facilitate the creation and management of a lookahead schedule, these software applications are very rudimentary in nature and thus have many limitations. First, these existing software applications generally provide a "spreadsheet-style" user interface that requires a user (e.g., a superintendent) to manually input the information that defines a lookahead schedule, which is inefficient, cumbersome, and susceptible to errors. For instance, the user may manually input information (e.g., months, dates, etc.) that defines a timeline for the lookahead schedule into a spreadsheet. The user may then search for an electronic copy of the master schedule in order to copy entries of high-level tasks included in the master schedule that fall within the timeline that defines the lookahead schedule and paste the high-level tasks into the spreadsheet. In some instances, an electronic copy of the master schedule may not be readily available, in which case, the user may manually input into the spreadsheet each high-level task included in the master schedule that falls within the timeline that defines the lookahead schedule. The user may then manually shift the planned start and/or completion dates of each high-level task in the spreadsheet, add more granular-level tasks or subtasks that need to be performed on a day-to-day basis by manually inputting information that defines these tasks or subtasks into the spreadsheet, and for each task or subtask, the user may input a start date and a finish date for the task and manually create some type of metric for the task in order to keep track of the task's progress.

Second, as the construction project progresses, a subsequent lookahead schedule may need to be created, which is even more inefficient, cumbersome and susceptible to errors because a user has to evaluate both the master schedule and a previous lookahead schedule in order to create the subsequent lookahead schedule. For instance, the user may manually input information (e.g., months, dates, etc.) that defines a timeline for the subsequent lookahead schedule into a spreadsheet. The user may then search for an electronic copy of the master schedule in order to copy entries of high-level tasks included in the master schedule that fall within the timeline included in the subsequent lookahead schedule and paste them into the spreadsheet. The user may also visually compare the tasks included in a previous lookahead schedule and the master schedule and copy entries of any granular-level task included in the previous lookahead schedule that falls within the timeline included in the subsequent lookahead schedule (and does not overlap with any tasks already copied from the master schedule) and paste them into the spreadsheet for the subsequent lookahead schedule. In some instances, an electronic copy of the master schedule or the previous lookahead schedule may not be readily available, in which case, the user may manually input each task into the spreadsheet. The user may then add more granular-level tasks or subtasks that need to be performed on a day-to-day basis by manually inputting that information into the spreadsheet, and for each task, the user may input a start date and a finish date for the task and manually create some type of metric for the task in order to keep track of the task's progress.

Third, these existing software applications do not provide a meaningful way to compare a lookahead schedule to the master schedule to identify differences between the two schedules. As a result, the user may need to compare the master schedule and one or more lookahead schedules side-by-side and evaluate both schedules in order to update the master schedule, or compare the master schedule and a previous lookahead schedule to create side-by-side and evaluate both schedules in order to create a subsequent lookahead schedule, both of which is inefficient, cumbersome, and susceptible to errors.

To help address these and other problems, disclosed herein is new software technology for creating and managing a lookahead schedule for a construction project. At a high level, the disclosed software technology may function to automate the creation of lookahead schedules for a construction project and provide a user interface through which users are able to review and manage a given lookahead schedule.

In one aspect, the disclosed software technology may be embodied in a software application that includes different workflows. For instance, the disclosed software application may include (1) a first workflow for creating an initial lookahead schedule for a construction project, and (2) a second workflow for creating a subsequent lookahead schedule for the construction project. Each of these workflows may take various forms and be carried out in various manners.

In one implementation, the first workflow for creating an initial lookahead schedule may involve (1) presenting a user interface through which a user (e.g., a project manager employed by the GC, some other employee of a GC, or an employee of a SC) may input a request to create an initial lookahead schedule, which may include timeline information for the initial lookahead schedule, (2) receiving, via the user interface, the request to create the initial lookahead schedule, (3) dynamically creating the initial lookahead schedule based on the received request and a previously-created master schedule for the construction project, and (4) presenting the initial lookahead schedule that has been created via the user interface. The user may then interact with this user-interface view to manage the initial lookahead schedule in various manners described in more detail below.

As the project progresses, the user may decide to initiate the second workflow for creating a subsequent lookahead schedule, which may generally involve dynamically creating the subsequent lookahead schedule based on the master schedule and a past lookahead schedule (e.g., the initial lookahead schedule) for the construction project. In one implementation, the second workflow for creating a subsequent lookahead schedule may involve (1) presenting a user-interface view through which a user (e.g., a project manager employed by the GC, some other employee of a GC, or an employee of a SC) may input a request to create a subsequent lookahead schedule, which may include timeline information for the subsequent lookahead schedule and/or information that defines a previous lookahead schedule, (2) receiving, via the user-interface view, the request to create the subsequent lookahead schedule, (3) dynamically creating the subsequent lookahead schedule based on the received request and the previously-created master schedule for the construction project, and (4) presenting the subsequent lookahead schedule that has been created via the user interface. The user may then interact with this user-interface view to manage the subsequent lookahead schedule in various manners described in more detail below.

Accordingly, in one aspect, disclosed herein is a method that involves (1) receiving, from a client station, a request to create an initial lookahead schedule for a project, wherein the request comprises timeline information for the initial lookahead schedule, (2) after receiving the request, creating the initial lookahead schedule based on the timeline information and a previously-created master schedule for the project, and (3) causing the client station to present a user-interface view that provides a representation of the initial lookahead schedule.

In another aspect, disclosed herein is a computing system that includes at least one processor, a non-transitory computer-readable medium, and program instructions stored on the non-transitory computer-readable medium that are executable by the at least one processor such that the computing system is configured to carry out the functions disclosed herein, including but not limited to the functions of the foregoing method.

In yet another aspect, disclosed herein is a non-transitory computer-readable medium having program instructions stored thereon that executable such that a computing system is configured to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, the present disclosure is directed to new software technology for creating and managing a lookahead schedule for a construction project. At a high level, the disclosed software technology may function to automate the creation of lookahead schedules for a construction project and provide a user interface through which users are able to review and manage a given lookahead schedule.

In one aspect, the disclosed software technology may be embodied in a software application that includes different workflows. For instance, the software application may include (1) a first workflow for creating an initial lookahead schedule for a construction project, and (2) a second workflow for creating a subsequent lookahead schedule for the construction project. Each of these workflows may take various forms and be carried out in various manners.

I. EXAMPLE SYSTEM CONFIGURATION

Figure 1:
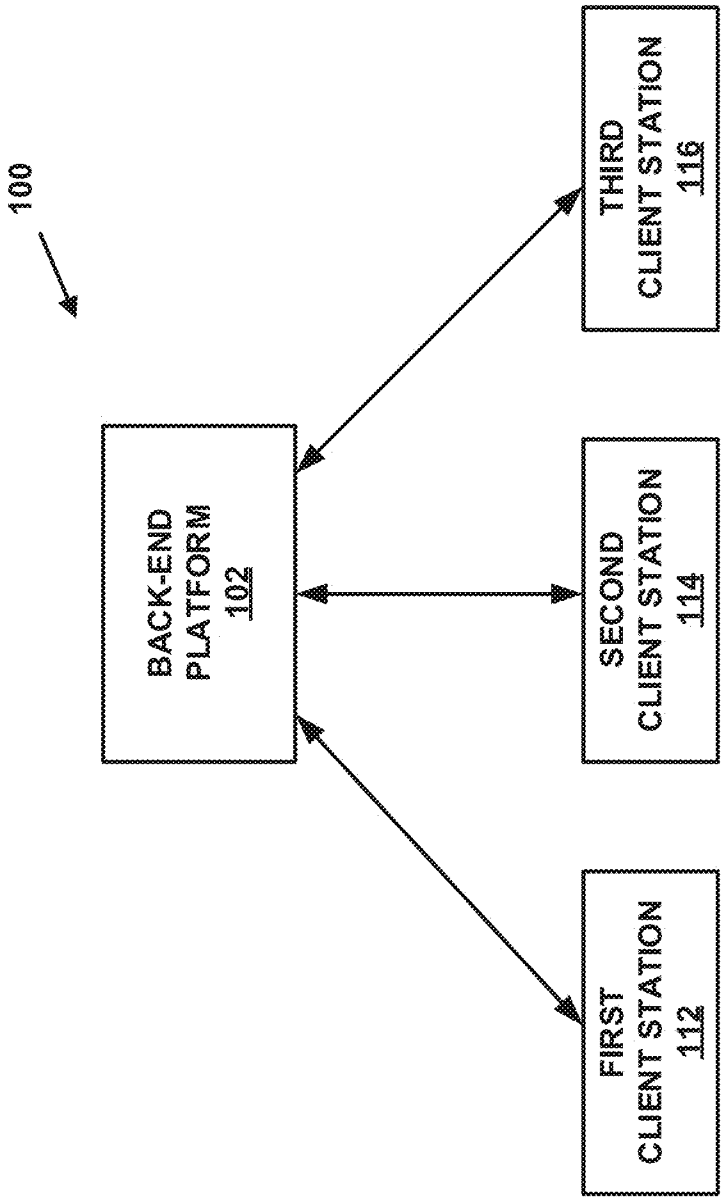
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as client stations 112.

Broadly speaking, back-end platform 102 may comprise one or more computing systems that have been provisioned with software for carrying out one or more of the functions disclosed herein, including but not limited to functions for creating an initial lookahead schedule and/or a subsequent lookahead schedule for a construction project. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the functions disclosed herein. Other implementations of back-end platform 102 are possible as well.

As further depicted in FIG. 1, back-end platform 102 is configured to interact with client stations 112, 114, 116 over respective communication paths. In this respect, each communication path between back-end platform 102 and one of client stations (e.g., client station 112) may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols. Although not shown, the respective communication paths between client stations 112, 114, 116 and back-end platform 102 may also include one or more intermediate systems. For example, it is possible that back-end platform 102 may communicate with a given client station (client station 112) via one or more intermediary systems, such as a host server (not shown). Many other configurations are also possible.

Although not shown in FIG. 1, back-end platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
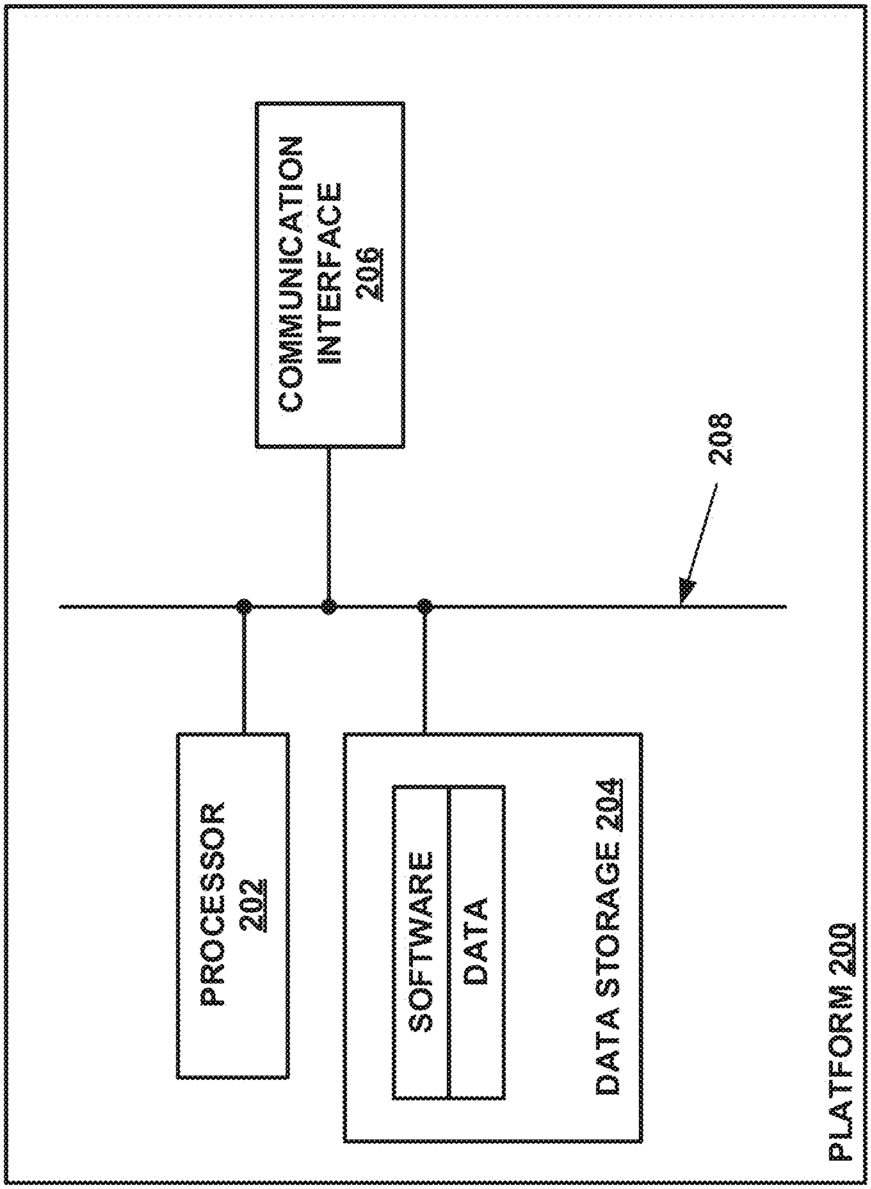
FIG. 2 depicts an example computing platform that may be configured to carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store data in one or more databases, file systems, or the like. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE OPERATIONS

As noted above, the present disclosure is directed to new software technology for creating and managing a lookahead schedule for a construction project. At a high level, the disclosed software technology may function to automate the creation of lookahead schedules for a construction project and provide a user interface through which users are able to review and manage a given lookahead schedule.

In one aspect, the disclosed software technology may be embodied in a software application (e.g., a construction management software application) that includes different workflows. For instance, the software application may include (1) a first workflow for creating an initial lookahead schedule for a construction project, and (2) a second workflow for creating a subsequent lookahead schedule for the construction project. Each of these workflows may take various forms and be carried out in various manners.

For the purposes of illustration, the disclosed software technology will now be described in the context of an example construction management software application that incorporates the disclosed software technology. In practice, the construction management software application may be embodied in the form of a software as a service ("SaaS"), in which case the software application may include a front-end software component running on a user's client station (e.g., client station 112) and a back-end software component running on a back-end platform (e.g., back-end platform 102) that is accessible to the user's client station via a communication network such as the Internet. Further, in practice, the back-end platform associated with a construction management SaaS application may be capable of serving multiple different users that have signed up for access to the construction management SaaS application, where each user has its own respective account for the construction management SaaS application.

In accordance with the present disclosure, in some instances, before a lookahead schedule for a construction project is created, a master schedule for the construction project may be created. The example construction management software application may provide a tool that facilitates creation and management of the master schedule. This tool may take various forms.

Figure 3:
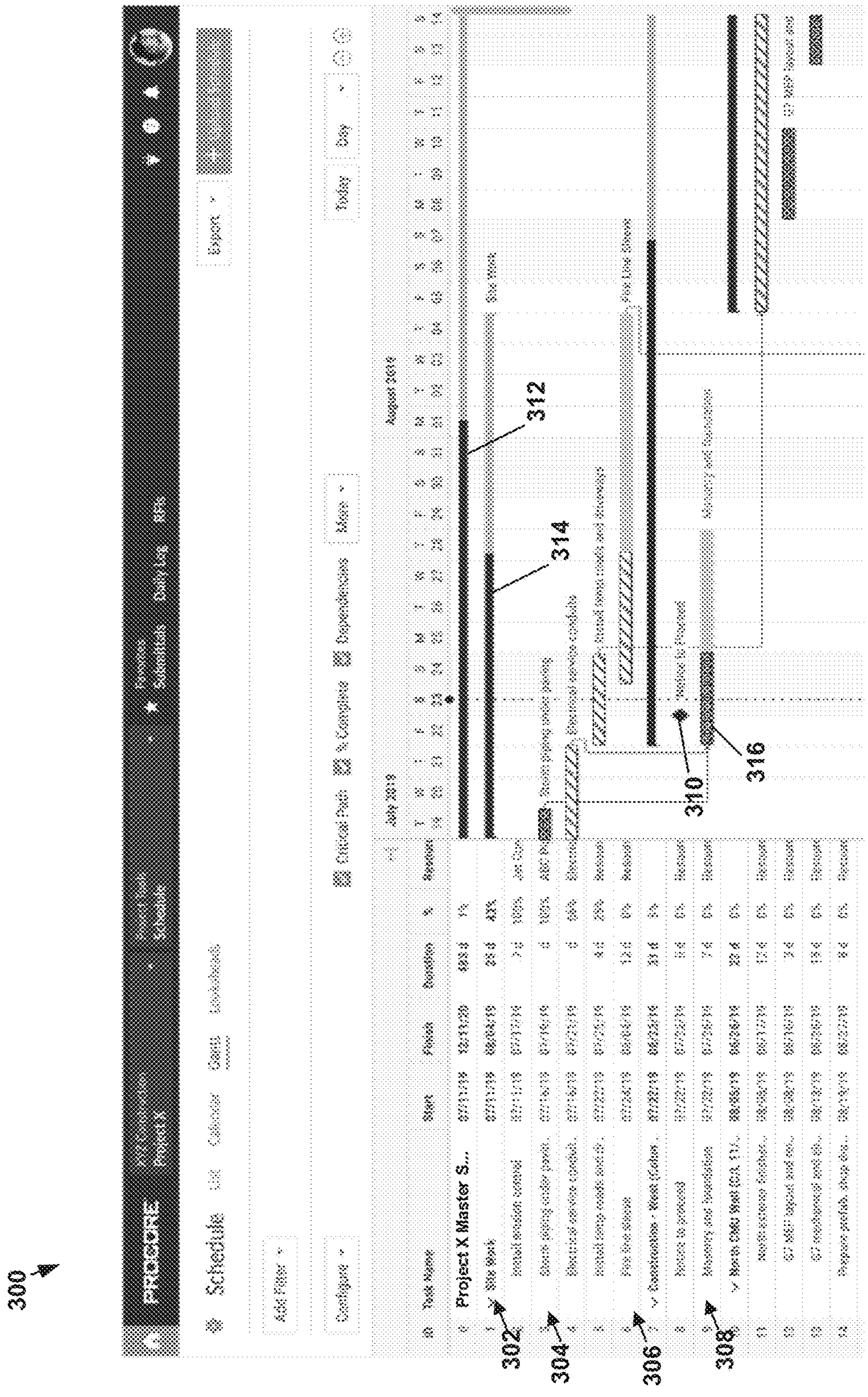
FIG. 3 depicts an example view of a master schedule in accordance with the present disclosure.

As one example to illustrate, FIG. 3 depicts an example view 300 that includes various elements to create and/or manage a master schedule for a construction project. For instance, as shown, view 300 may include various tasks (e.g., task 302) and subtasks (e.g., subtasks 304-308) that need to be completed for a construction project named "Project X." View 300 may also include a timeline for project deliverables, project milestones (e.g., project milestone 310), and for completing the tasks and subtasks included in the master schedule.

As further shown in FIG. 3, view 300 may also include a Gantt chart, which is a type of bar chart that may include a planned start date and a planned finish date for each task or subtask included in the master schedule, one or more resources assigned to each task or subtask, and any dependencies between two given tasks (for instances where the completion of one given task depends on the completion of another given task). For example, with respect to task 302, view 300 includes data fields that define task 302, such as a unique identifier for task 302 (e.g., a task ID that is set to "1"), a planned started date for task 302 (e.g., "Jul. 16, 2019"), a planned finish date for task 302 ("Aug. 4, 2019"), a duration to complete task 302 (e.g., "25" days), and an indication of how much progress has been made in completing task 302 (e.g., "43%"). View 300 also includes a progress bar 314 that visually indicates the planned start and finish dates for task 302 (e.g., as indicated by each end of progress bar 314) and visually indicates how much progress has been made in completing task 302.

As another example, with respect to subtask 304 (which is a subtask of task 302), view 300 includes data fields that define subtask 304, such as a unique identifier for subtask 304 (e.g., a task ID that is set to "3"), a planned started date for subtask 304 (e.g., "Jul. 16, 2019"), a planned finish date for subtask 304 ("Jul. 19, 2019"), a resource that has been assigned to subtask 304 (e.g., labor from a SC named "ABC Concrete"), and an indication of how much progress has been made in completing subtask 304 (e.g., "100%"). View 300 also includes a progress bar that visually indicates the planned start and finish dates for subtask 304 and visually indicates how much progress has been made in completing subtask 304. Further, view 300 includes a line that connects the progress bar for subtask 304 to progress bar 316 that indicates how much progress has been made in completing subtask 308. The line that connects the progress bar for subtask 304 to progress bar 316 may indicate that subtask 304 must be completed before subtask 308 can be performed.

As further shown in FIG. 3, view 300 may also include an indication of whether a task (or subtask) is a "critical path" task or a "non-critical path" task. For instance, the progress bar for a critical path task or subtask (e.g., subtask 304) may be shaded differently than the progress bar for a non-critical path task or subtask (e.g., subtask 308). As noted above, a "critical path" task (or subtask) may be a task that needs to be completed on time in accordance with the planned finish date for the task in order to guarantee that the GC will complete the project by the project's deadline, whereas a "non-critical path" task (or subtask) may be a task that can be delayed for a given period of time without negatively impacting the project's deadline.

One of ordinary skill in the art will appreciate that view 300 may include various other elements as well. For instance, view 300 may include progress bar 312 that visually indicates the planned start and finish dates for the construction project named "Project X" (e.g., as indicated by each end of progress bar 314) and visually indicates how much progress has been made in completing the construction project.

In practice, each task (or subtask) included in the master schedule may have its own respective data record that defines the task (or subtask), and the respective data records for these tasks (or subtasks) included in the master schedule may take various forms. For instance, a respective data record for a given task (or subtask) may comprise a unique identifier for the task (or subtask) as well as data fields that define the task (or subtask), such as a name of the task (or subtask), a planned started date, a planned finish date, a resource assigned to the task (or subtask), a duration to complete the task (or subtask), and/or an indication of how much progress has been made in completing the task (or subtask), among other possible data fields that may further define the task (or subtask). In turn, the master schedule for the construction project is represented by data structure that includes a unique identifier for the master schedule and a list of data record identifiers, where each data record identifier identifies a respective data record included in the master schedule.

The tool that facilitates the creation and management of the master schedule may take various other forms as well.

After the master schedule for the construction project has been created, the example construction management software application may facilitate the creation of an initial lookahead schedule that summarizes the upcoming weeks (e.g., the upcoming 1 to 6 weeks) of the construction project and provides more granular-level tasks that need to be completed by construction workers on a day-to-day basis for one or more upcoming weeks. For instance, the example construction management software application may initiate the first workflow for creating an initial lookahead schedule. The first workflow may take various forms and may be carried out in various manners.

Figure 4:
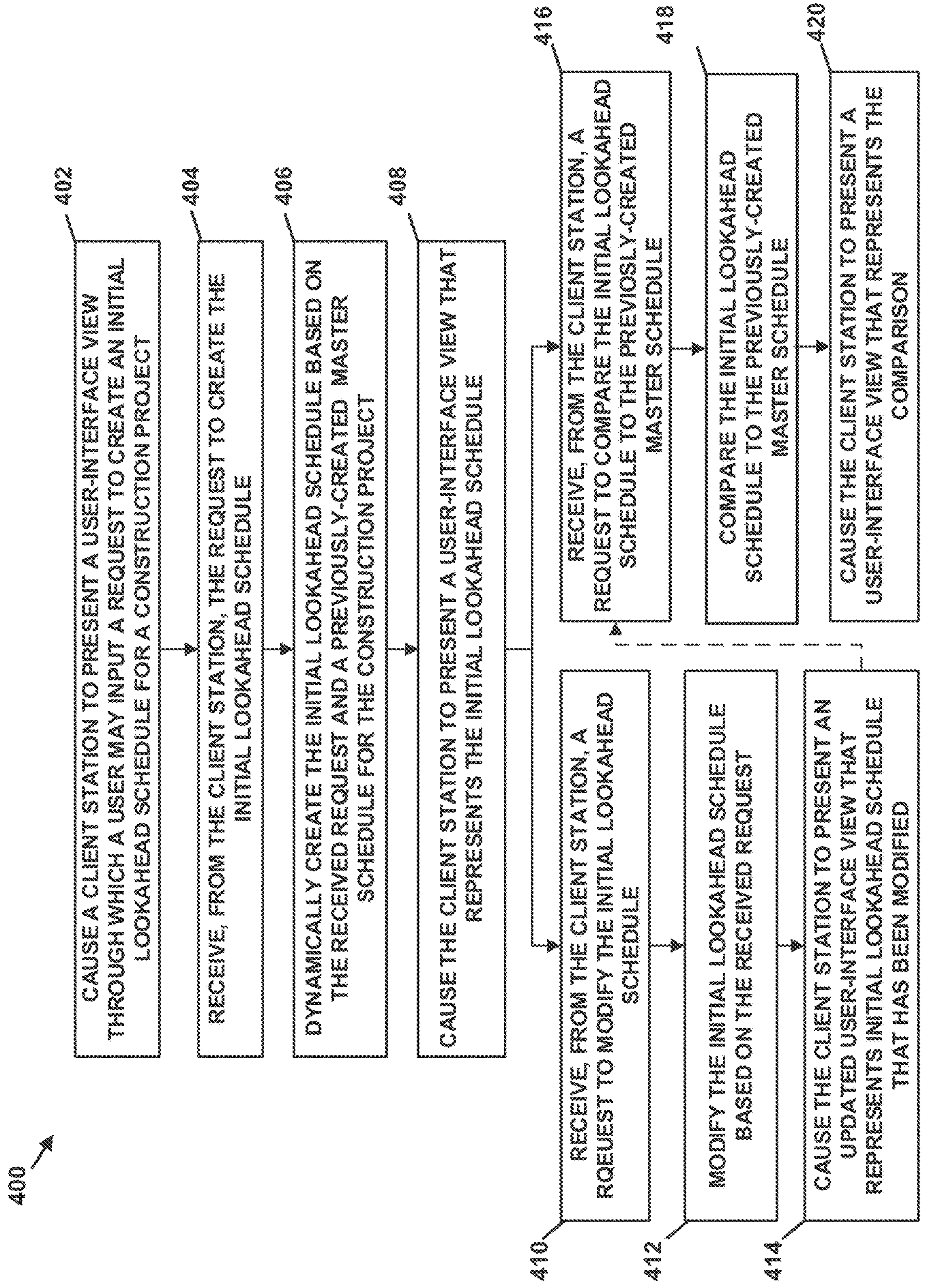
FIG. 4 depicts an example flow diagram for the first workflow of the disclosed software application in accordance with the present disclosure.

One possible example of the first workflow will now be described with reference to FIG. 4. For the purposes of illustration only, the example functions involved in the example first workflow are described as being carried out by a back-end platform (e.g., back-end platform 102). However, it is possible that the responsibility for carrying out these example functions could be distributed between a back-end platform (e.g., back-end platform 102) and one or more client stations (e.g., client stations 112, 114, and/or 116). Further, it should be understood that example flow diagram 400 shown in FIG. 4 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the first workflow may involve a user (e.g., an individual associated with a GC, such as a project manager employed by the GC or an employee of a SC) requesting access to a tool that facilitates the creation of an initial lookahead schedule by, for example, launching a native application on a client station associated with the user or directing a web browser on the client station associated with the user to a uniform resource locator (URL) for the construction management software application, either of which may cause the user's client station (e.g., client station 112) to send a request to back-end platform 102 to access the tool.

At block 402, back-end platform 102 may then cause the user's client station (e.g., client station 112) to present a user-interface view through which the user may input a request to create an initial lookahead schedule. The request that may be input by the user may take various forms.

For instance, the request to create the initial lookahead schedule may comprise timeline information for the initial lookahead schedule that defines the timeline for the initial lookahead schedule. The timeline information may include a start date for the initial lookahead schedule and a duration for the initial lookahead schedule (e.g., the upcoming 1-2 weeks). The request that may be input by the user may take various other forms as well.

Figure 5:
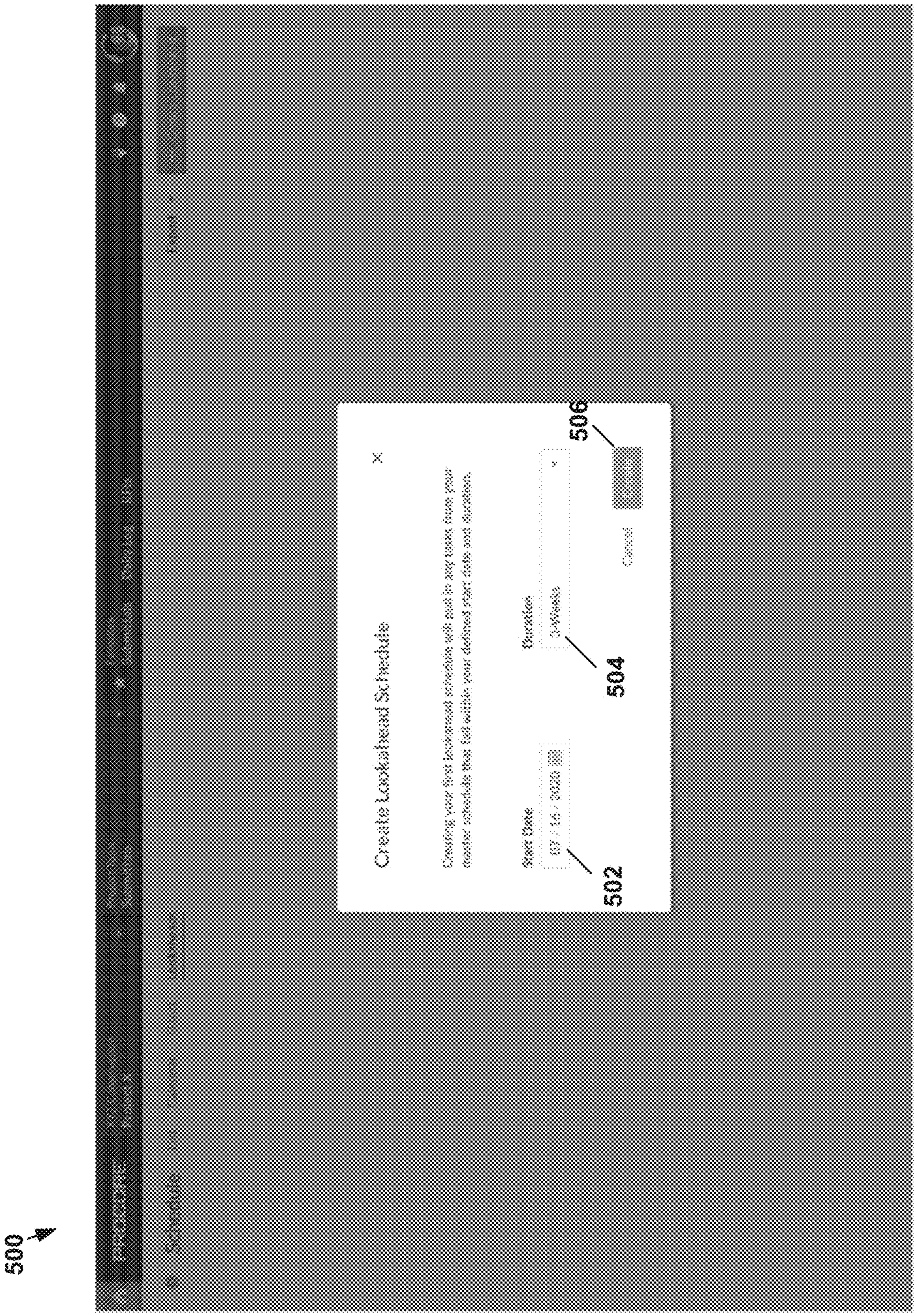
FIG. 5 depicts an example view of the disclosed software application that may be presented to a client station to create an initial lookahead schedule in accordance with the present disclosure.

Further, the request that may be input by the user to create the initial lookahead schedule may be inputted by the user in various manners. To illustrate, FIG. 5 depicts an example user-interface view 500 that may facilitate the creation of the initial lookahead schedule. As shown, view 500 includes data fields to input timing information that defines the timeline for the initial lookahead schedule. For instance, view 500 includes data field 502 to input a start date for initial lookahead schedule (e.g., "Jul. 16, 2020"), which may be inputted by either typing in the start date in data field 502 or inputting the start date by selecting a date from a calendar that may be accessed by selecting the calendar icon in data field 502. View 500 may also include data field 504 to input a duration for the initial lookahead schedule (e.g., the upcoming 3 weeks starting from "Jul. 16, 2020"), which may be inputted by selecting the duration from a drop-down menu in data field 504.

The request that may be input by the user to create the initial lookahead schedule may be inputted by the user in various other manners as well.

At block 404, back-end platform 102 may then receive, from the user's client station (e.g., client station 112), the request to create the initial lookahead schedule. Back-end platform 102 may receive the request at various times.

As one example, while accessing the user-interface view (e.g., view 500) that facilities the creation of the initial lookahead schedule, the user may select create button 506, and back-end platform 102 may then receive the request to create the initial lookahead schedule in response to the user's selection of create button 506. As another example, while accessing the user-interface view (e.g., view 500) that facilities the creation of the lookahead schedule, the user may interact with data field 502 and/or data field 504, and back-end platform 102 may receive the request from the user's client station each time the user interacts with data field 502 and/or data field 504.

Back-end platform 102 may receive the request to create the initial lookahead schedule at various other times as well.

At block 406, back-end platform 102 may dynamically create the initial lookahead schedule based on the received request and a previously-created master schedule for the construction project. In this respect, the function of dynamically creating the initial lookahead schedule may take various forms.

In one implementation, function of dynamically creating the initial lookahead schedule may involve identifying tasks (and/or subtasks) included in a previous-created master schedule (e.g., the master schedule depicted in view 300 of FIG. 3) that meet the timeline information (e.g., the start date and the duration) for the initial lookahead schedule included in the received request and then copying the identified tasks (and/or subtasks) into the initial lookahead schedule being created. For instance, if the start date for the initial lookahead schedule is set to Jul. 16, 2020 and the duration is set to 3 weeks, back-end platform 102 may identify tasks (and/or subtasks) that fall in a given 3-week range, such as (1) a range between Jul. 16, 2020 and Aug. 5, 2020 (i.e., 3 weeks from Jul. 16, 2020), (2) a range that starts on Jul. 16, 2020 and ends before Aug. 5, 2020 (e.g., Aug. 4, 2020), (3) a range that starts after Jul. 16, 2020 (e.g., Jul. 17, 2020) and ends before Aug. 5, 2020 (e.g., Aug. 4, 2020), or (4) a range that starts before Jul. 16, 2020 (e.g., Jul. 15, 2020) and ends after Aug. 5, 2020 (e.g., Aug. 6, 2020). Back-end platform 102 may then copy the identified tasks (and/or subtasks) into the initial lookahead schedule being created.

In practice, copying the identified tasks (and/or subtasks) into the initial lookahead schedule may involve accessing the respective data records of the master schedule that represent the identified tasks (and/or subtasks), creating a copy of the respective data records of the master schedule, and then including a reference to the newly-copied data records within a data structure that includes a unique identifier for the initial lookahead schedule and a list of data record identifiers, where each data record identifier identifies a newly-copied data record for a given task (or subtask) included in the initial lookahead schedule. As noted above, a data record for a given task (or subtask) may comprise a unique identifier for the task (or subtask) as well as data fields that define the task (or subtask), such as a name of the task (or subtask), a planned started date, a planned finish date, a resource assigned to the task (or subtask), a duration to complete the task (or subtask), and/or an indication of how much progress has been made in completing the task (or subtask), among other possible data fields that may further define the task (or subtask).

The function of dynamically creating the initial lookahead schedule may take various other forms as well.

In turn, at block 408, back-end platform 102 may cause the user's client station (e.g., client station 112) to present a user-interface view that represents the initial lookahead schedule. The user-interface view that represents the initial lookahead schedule may take various forms.

Figure 6A:
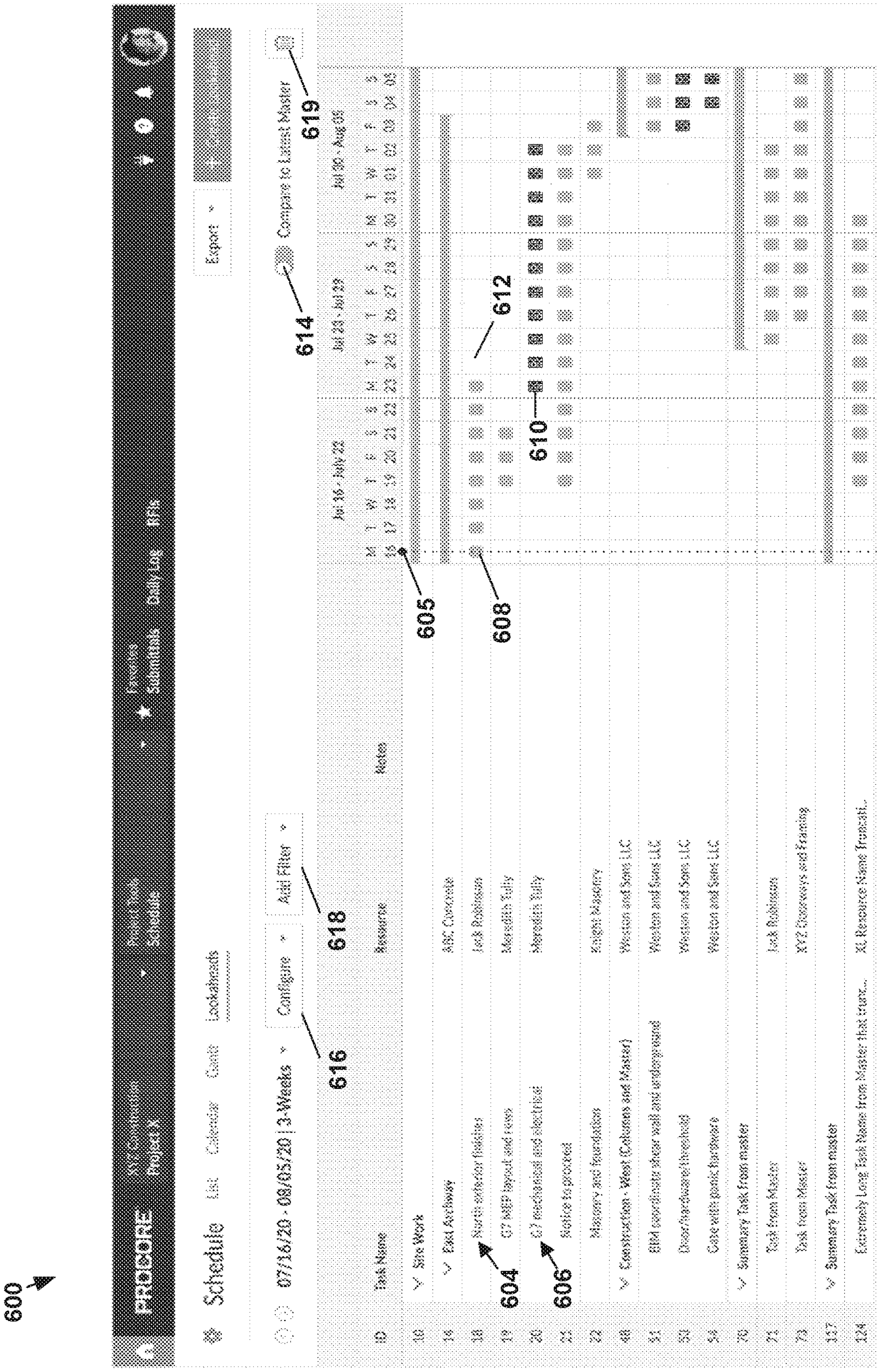
FIG. 6A depicts an example view of a lookahead schedule in accordance with the present disclosure.

As one example to illustrate, FIG. 6A depicts an example user-interface view 600 that represents an initial lookahead schedule. As shown, view 600 may include various elements to manage the initial lookahead schedule. For example, view 600 may include a timeline that captures the start date for the initial lookahead schedule (e.g., Jul. 16, 2020) and the duration for the initial lookahead schedule that was included in the received request (e.g., Aug. 5, 2020, which is 3 weeks from Jul. 16, 2020). As another example, view 600 may include indicator 605 that indicates the current date (e.g., Jul. 16, 2020).

As yet another example, view 600 may include various tasks and/or subtasks (e.g. subtasks 604-606) that have been copied from a previously-created master schedule. For each task (or subtask), view 600 may include a unique identifier, a name for the task (or subtask), a resource assigned to the task (or subtask), an indication of a duration to complete the task (or subtask), an indication of a planned started date, an indication of a planned finish date, and/or an indication of how much progress has been made in completing task (or subtask), among other elements that may further define the tasks (or subtask).

For instance, with respect to subtask 604, view 600 may include a unique identifier for subtask 604 (e.g., a task ID that is set to "18"), a name for subtask 604 (e.g., "North exterior finishes"), a resource assigned to subtask 604 (e.g., labor from an employee named "Jack Robinson"), an indication of a duration to complete subtask 604 (which may be indicated by the number of squares shown in the same row as subtask 604 in view 600, i.e., 7 days), an indication of a planned start date for subtask 604 (which may be indicated by the date corresponding to first square 608 shown in the same row as subtask 604 in view 600, i.e., Jul. 16, 2020), an indication of a planned finish date for subtask 604 (which may be indicated by the date corresponding to the last square shown in the same row as subtask 604 in view 600, i.e., Jul. 23, 2020), and an indication of how much progress has been made in completing subtask 604, which may be indicated by the shading of each square shown in the same row as subtask 604 in view 600. For instance, each square shown in the same row as subtask 604 currently indicates that no progress has been made in completing subtask 604. However, as the project progresses, each of these squares may be updated (e.g., with a different color and/or a different shading) to indicate how much progress has been made in completing subtask 604.

As further shown in FIG. 6A, view 600 may also include an indication of whether a task (or subtask) is a critical path task or a non-critical path task. For instance, the squares shown in the same row as subtask 604 (e.g., square 608) may be shaded differently than the squares shown in the same row as subtask 606 (e.g., square 610) to indicate that subtask 604 is a non-critical path task and subtask 606 is a critical path task.

View 600 may include various other elements as well (some of which may be described in more detail below). Further, the user-interface view that represents the initial lookahead schedule may take various other forms as well.

After the initial lookahead schedule has been created, the user-interface view that represents the initial lookahead schedule may enable a user to interact with the initial lookahead schedule in various manners in order to modify some aspect of the initial lookahead schedule. Generally speaking, any user of the example construction software application may interact with the initial lookahead schedule, which may include any individual employed by the GC that has an account to access the example construction software application, or any individual employed by a SC that has an account to access the example construction software application and has the GC's permission to access the initial lookahead schedule and/or modify some aspect of the initial lookahead schedule.

One user interaction with the initial lookahead schedule that may be facilitated by the example construction management software application may involve editing the data record for a given task (or subtask) included in the initial lookahead schedule. For instance, the user-interface view that represents the initial lookahead schedule (e.g., view 600) may enable the user to edit the name of the task (or subtask), the planned started date for the task (or subtask), the planned finish date for the task (or subtask), the resource assigned to the task (or subtask), the duration to complete the task (or subtask), and/or the indication of how much progress has been made in completing the task (or subtask), among other possibilities.

As one specific example, the user-interface view that represents the initial lookahead schedule may enable the user to edit the planned finish date for a given task by inputting an indication to add one or more days to the planned number of days to complete the given task. The user may input this indication in various manners.

As one possibility, referring back to FIG. 6A, the user may input an indication to add a day to the planned number of days to complete subtask 604, by selecting the empty individual cell in the same row as subtask 604 that corresponds to the July 24 (i.e., cell 612). The user may also input an indication to add additional days to complete subtask 604 by selecting additional empty individual cells in the same row as subtask 604 and to the right of cell 612.

Figure 6B:
FIG. 6B depicts another example view of a lookahead schedule in accordance with the present disclosure.

As another possibility, the user may input an indication to add one or more days to the planned number of days to complete subtask 604 via a click-and-drag input, which may take various forms. For example, the user may input an indication to add one or more days to the planned number of days to complete subtask 604 by clicking cell 612 via a mouse, dragging a cursor to an empty individual cell in the same row as subtask 604, and then releasing the mouse. Specifically, the user may add 3 more days to the planned number of days to complete subtask 604 by clicking cell 612 via a mouse and dragging a cursor to the empty individual cell that corresponds to July 26. View 600 may then transition to example user-interface view 601 shown in FIG. 6B.

As shown, view 601 includes an indication to add 3 more days to the planned number of days to complete subtask 604, which is indicated by the unshaded cells in the same row as subtask 604. View 601 may also include cursor 620 that indicates that the user has currently dragged cursor 620 to the empty individual cell that corresponds to July 26. The user may then release the mouse to input the indication to add 3 more days to the planned number of days to complete subtask 604.

The click-and-drag input may take various other forms as well. As another example, in instances where the user's client station includes a touch screen, the user may input the indication to add one or more days to the planned number of days to complete subtask 604 by selecting cell 612 via the user's finger (e.g., the user's index finger), dragging the user's finger to an empty individual cell in the same row as subtask 604, and then releasing the user's finger from the touch screen.

The user may input the indication to add one or more days to the planned number of days to complete a given task in various other manners as well.

As another specific example of the user interaction noted above that involves editing the data record for a given task (or subtask) included in the initial lookahead schedule, the user-interface view that represents the initial lookahead schedule may enable the user to edit the indication of how much progress has been made in completing a given task (or subtask) by inputting an indication that work for the given task has been completed for a particular day. The user may input this indication in various manners.

As one possibility, with reference to FIG. 6A, the user may input an indication that work for subtask 604 has been completed for July 16 by selecting square 608, which may then cause the user's client station to update square 608 to a different color and/or shading to indicate that work has been completed for the day that corresponds to square 608 (e.g., July 16). The user may select another square in the same row to indicate that work has been completed for the day corresponding to that square as well.

As another possibility, the user may select subtask 604 (or hover over the row corresponding to subtask 604), which may then cause the user's client station to present an indicator to edit subtask 604. The user may then select the indicator to send a request to edit subtask 604, which may in turn cause the user's client station to present a window in view 600 (not shown) that may facilitate editing subtask 604. In particular, the user may be presented with a window in view 600 that may enable the user to add a comment and/or attach a file (e.g., an image file) that may provide status information for subtask 604. Based on the comment and/or the attached file, back-end platform 102 may determine how much progress has been made for subtask 604 and then cause the user's client station to update one or more squares (e.g., square 608) in the same row as subtask 604 to a different color and/or shading to indicate how much work has been completed for subtask 604.

The user may edit the indication of how much progress has been made in completing a given task (or subtask) in various manners as well.

Another user interaction with the initial lookahead schedule that may be facilitated by the example construction management software application may involve adding a new task (or subtask) to the initial lookahead schedule that needs to be completed during the defined duration for the initial lookahead schedule, deleting a given task (or subtask) from the initial lookahead schedule, and/or deleting the entire initial lookahead schedule. For instance, referring back to FIG. 6A, while accessing view 600, the user may input an indication to add an additional task (or subtask) to the initial lookahead schedule, delete a given task (or subtask) from the initial lookahead schedule, and/or delete the entire initial lookahead schedule. The user may input this indication in various manners.

As one possibility, to add a new subtask for "East Archway" above subtask 604, the user may select subtask 604 (or hover over the row corresponding to subtask 604), which may then cause the user's client station to present an indicator to add a new subtask. The user may then select the indicator to send a request to add the new subtask, which may in turn cause back-end platform 102 to present a window in view 600 (not shown) that may facilitate adding the new subtask. In particular, the user may be presented with a window in view 600 that may enable the user to input a name for the new subtask to be added, a planned start and finish date for the new subtask to be added, a resource to be assigned to the new subtask, and/or any notes that may further define the new subtask.

As yet another possibility, to delete the entire initial lookahead schedule, the user may select delete button 619 shown in view 600 to input the indication to delete the entire initial lookahead schedule.

As yet another possibility, to delete the entire initial lookahead schedule, the user may select delete button 622 shown in view 600 to input the indication to delete the entire initial lookahead schedule.

The user may input the indication to add or delete a given task (or subtask) or delete the initial lookahead schedule in various other manners as well. Further, the user-interface view that represents the initial lookahead schedule (e.g., view 600) may enable the user to interact with the initial lookahead schedule in various other manners as well.

For instance, another user interaction with the initial lookahead schedule that may be facilitated by the example construction management software application may involve generating a progress report by exporting the initial lookahead schedule via an export control button included in the user-interface view that represents the initial lookahead schedule.

Yet another user interaction with the initial lookahead schedule that may be facilitated by the example construction management software application may involve filtering certain tasks or subtasks included in the initial lookahead schedule. For instance, while accessing the user-interface view that represents the initial lookahead schedule (e.g., view 600), the user may input an indication to show tasks or subtasks that are only assigned to a specific resource (e.g., a specific SC) and/or input an indication to show tasks or subtasks that comprise critical path tasks or subtasks by selecting an appropriate filter from a drop-down menu that may be included in the user-interface view (e.g., drop-down menu 618 of view 600).

Still another user interaction with the initial lookahead schedule that may be facilitated by the example construction management software application may involve configuring the format of the initial lookahead schedule. For instance, while accessing the user-interface view that represents the initial lookahead schedule (e.g., view 600), the user may input an indication to configure the timeline that defines the initial lookahead schedule to display Saturdays and Sundays and/or input an indication to display the start date and the finish date for each task or subtask in text.

Yet another user interaction with the initial lookahead schedule that may be facilitated by the example construction management software application may involve navigating to another tool provided by the construction management software application that may enable the user to perform some aspect of a given task included in the initial lookahead schedule. The user may navigate to another tool provided by the construction management software application in various manners.

For example, while accessing the user-interface view that represents the initial lookahead schedule (e.g., view 600), the user may input an indication to navigate to a Request for Information ("RFI") tool by selecting the RFI tool from a drop-down menu that may be included in the user-interface view. The RFI tool may enable the user to create an RFI to obtain specific information that may be needed to complete a given task included in the initial lookahead schedule.

As another example, while accessing the user-interface view that represents the initial lookahead schedule (e.g., view 600), the user may input an indication to navigate to a "Budget" tool by selecting the Budget tool from a drop-down menu that may be included in the user-interface view. The Budget tool may enable the user to manage a budget for a given task and/or a budget for the construction project.

As yet another example, while accessing the user-interface view that represents the initial lookahead schedule (e.g., view 600), the user may input an indication to navigate to a "Documents" tool by selecting the Documents tool from a drop-down menu that may be included in the user-interface view. The Documents tool may enable the user to manage and save project documentation (e.g., drawings, specifications, emails, etc.) that may be needed to perform a given task included in the initial lookahead schedule.

As still another example, while accessing the user-interface view that represents the initial lookahead schedule (e.g., view 600), the user may input an indication to navigate to a "Submittals" tool by selecting the Submittals tool from a drop-down menu that may be included in the user-interface view. The Submittals tool may enable the user to submit information provided by a given SC to obtain approval of certain equipment and/or materials that may be needed to perform a given task included in the initial lookahead schedule.

The user may navigate to another tool provided by the construction management software application in various other manners as well. Further, the user-interface view that represents the initial lookahead schedule (e.g., view 600) may enable the user to interact with the initial lookahead schedule in various other manners as well.

At block 410, back-end platform 102 may then receive, from the user's client station (e.g., client station 112) a request to modify the initial lookahead schedule, where the request may include an indication to modify some aspect of the initial lookahead schedule and/or information on how to modify some aspect of the initial lookahead schedule based on the user's interactions. Back-end platform 102 may receive the request at various times.

As one possibility, back-end platform 102 may receive the request each time the user inputs an indication to add an additional day to the planned number of days to complete a given task or subtask, inputs an indication subtract a day from the planned number of days to complete the given task or subtask, inputs an indication to add a new task or subtask, inputs an indication to delete a given task or subtask, and/or inputs and indication to edit how much progress has been made in completing the given task or subtask, among other possibilities. As another possibility, back-end platform 102 may receive the request each time the user input an indication to save any modifications made to the initial lookahead schedule (e.g., via a save control button (not shown) that may be presented in view 600).

Back-end platform 102 may receive the request to modify the initial lookahead schedule at various other times as well.

At block 412, back-end platform 102 may then modify the initial lookahead schedule based on the received request. Back-end platform 102 may modify the initial lookahead schedule in various manners.

As one possibility, back-end platform 102 may modify a data record for a given task included in the initial lookahead schedule based on the received request that may include an indication to edit the data record for the given task and what information to edit. For instance, back-end platform 102 may modify the data record for subtask 604 based on the received request that may include an indication to add additional days to the planned finish date for subtask 604. In particular, back-end platform 102 may modify the duration to complete subtask 604 and modify the planned finish date for subtask 604 based on the received request.

As another possibility, back-end platform 102 may modify the initial lookahead schedule to include an additional subtask based on the received request that may include an indication to add a new subtask to the initial lookahead schedule and information that defines the new subtask. For instance, back-end platform 102 may add a new data record that defines the new subtask to be added to initial lookahead schedule. The new data record may comprise a unique identifier for the subtask as well as data fields that define the subtask, such as a name of the subtask, a planned started date, a planned finish date, a resource assigned to the subtask, a duration to complete the subtask, and/or an indication of how much progress has been made in completing the subtask, among other possible data fields that may further define the subtask. Back-end platform 102 may also add a data record identifier that identifies the new data record to the list of data record identifiers included in the data structure for the initial lookahead schedule.

Back-end platform 102 may modify the initial lookahead schedule in various other manners as well.

In turn, at block 414 back-end platform 102 may cause the user's client station (e.g., client station 112) to present an updated user-interface view that represents the initial lookahead schedule that has been modified. The updated user-interface view may take various forms, which may depend on how the initial lookahead schedule has been modified.

Figure 6C:
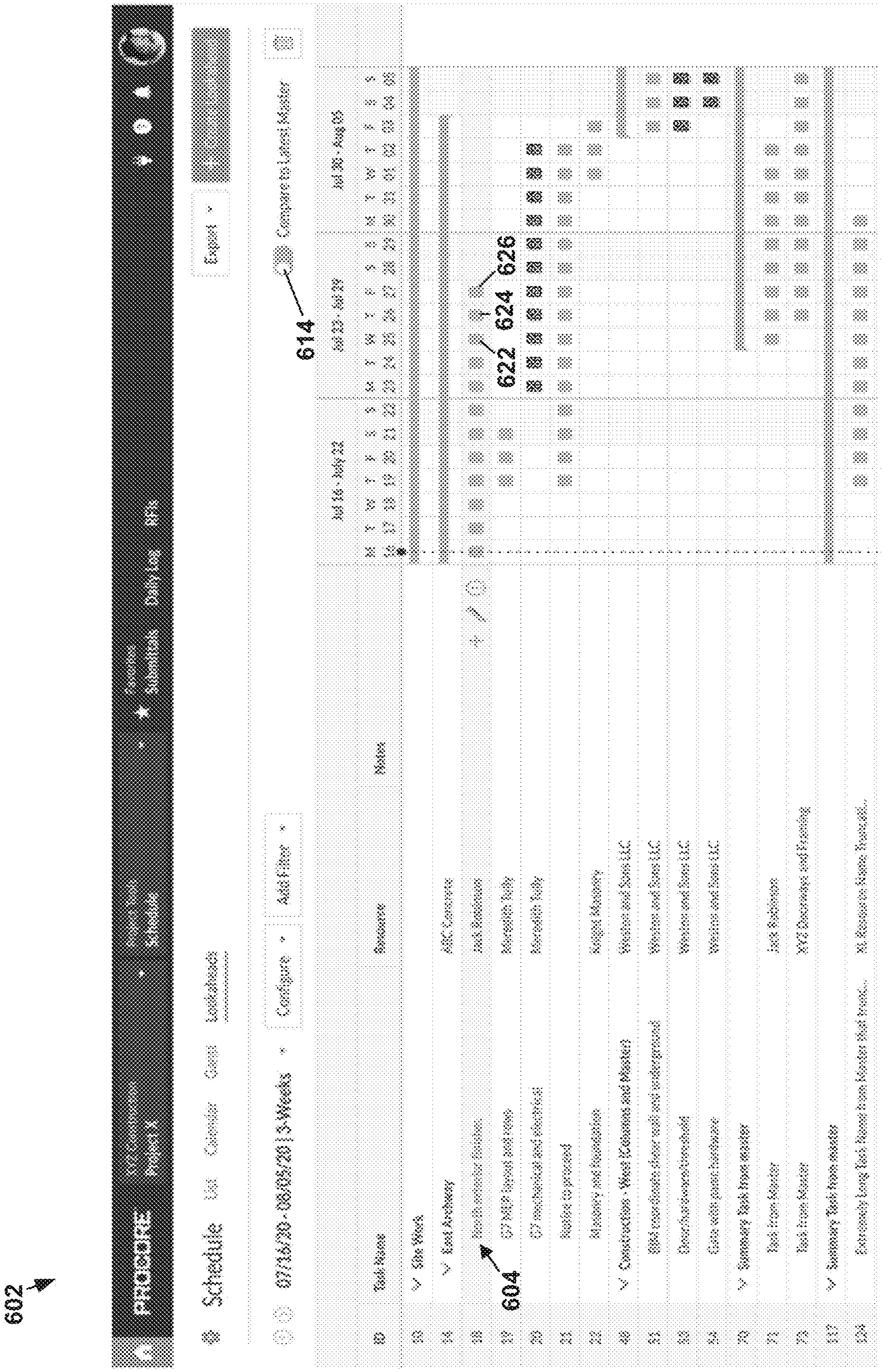
FIG. 6C depicts yet another example view of a lookahead schedule in accordance with the present disclosure.

As one example to illustrate, after the user inputs an indication to add 3 additional days to the planned finish date for subtask 604 (e.g., via the click-and-drag input described above with reference to FIG. 6B), back-end platform 102 may in turn cause the user-interface view that represents the initial lookahead schedule to transition from view 601 of FIG. 6B to updated user-interface view 602 of FIG. 6C. As shown in FIG. 6C, the initial lookahead schedule has been modified to add 3 additional days to the planned finished date for subtask 604, as indicated by squares 622-626. In this respect, view 602 indicates that the duration to complete subtask 604 has been increased by 3 additional days, and the new planned finish date for subtask 604 is July 27.

The updated user-interface view that represents the initial lookahead schedule that has been modified may take various other forms as well.

In accordance with the present disclosure, after the initial lookahead schedule has been created, the user-interface view that represents the initial lookahead schedule may enable a user (which may be the same individual that requested to create the initial lookahead schedule or a different individual that may be employed by the GC or a given SC) to compare the initial lookahead schedule to the previously-created master schedule for the construction project. For instance, the user may input a request via the user's client station (e.g., client station 112) to compare the initial lookahead schedule to the previously-created master schedule. The user may input this request in various manners.

As one possibility, the user-interface view that represents the initial lookahead schedule may include a control button that enables the user to input the request to compare the initial lookahead schedule to the previously-created master schedule. To illustrate, referring back to FIG. 6C, view 602 may include compare button 614. The user may toggle compare button 614 in order to input the request to compare the initial lookahead schedule shown in view 602 to the previously-created master schedule for the construction project.

The user may input the request to compare the initial lookahead schedule to the previously-created master schedule in various other manners as well.

At block 416, back-end platform 102 may then receive, from the user's client station (e.g., client station 112), the request to compare the initial lookahead schedule to the previously-created master schedule for the construction project. Back-end platform 102 may receive the request at various times. As one possibility, back-end platform 102 may receive the request after the user toggles compare button 614 in view 602. As another possibility, back-end platform 102 may receive the request after the user toggles compare button 614 in view 602, and then confirms that the user wishes to compare the initial lookahead schedule to the previously-created master schedule. Back-end platform 102 may receive the request at various other times as well.

At block 418, back-end platform 102 may compare the initial lookahead schedule to the previously-created master schedule. Back-end platform 102 may compare the initial lookahead schedule to the previously-created master schedule in various manners.

In one example implementation, back-end platform 102 may compare the data records of the initial lookahead schedule to the data records of the previously-created master schedule and identify any differences between the respective data records. For instance, back-end platform 102 may compare the unique identifiers of the tasks and subtasks included in the initial lookahead schedule to the unique identifiers of the tasks and subtasks included in the previously-created master schedule. Back-end platform 102 may then identify any unique identifier included in the initial lookahead schedule that does not match any unique identifiers included in the previously-created master schedule. A unique identifier included in the initial lookahead schedule that does not match a unique identifier included in the previously-created master schedule may represent a given task that has been added to the initial lookahead schedule and not included in the previously-created master schedule. Further, for each unique identifier included in the initial lookahead schedule that matches a unique identifier included in the previously-created master schedule, back-end platform 102 may identify any differences between the data fields of the data record associated with the unique identifier included in the initial lookahead schedule and the data fields of the data record associated with the unique identifier included in the previously-created master schedule.

Back-end platform 102 may compare the initial lookahead schedule to the previously-created master schedule in various other manners as well.

In turn, at block 420, back-end platform 102 may cause the user's client station (e.g., client station 112) to present a user-interface view that represents the comparison between the initial lookahead schedule and the previously-created master schedule for the construction project. The user-interface view that may be presented may take various forms.

Figure 6D:
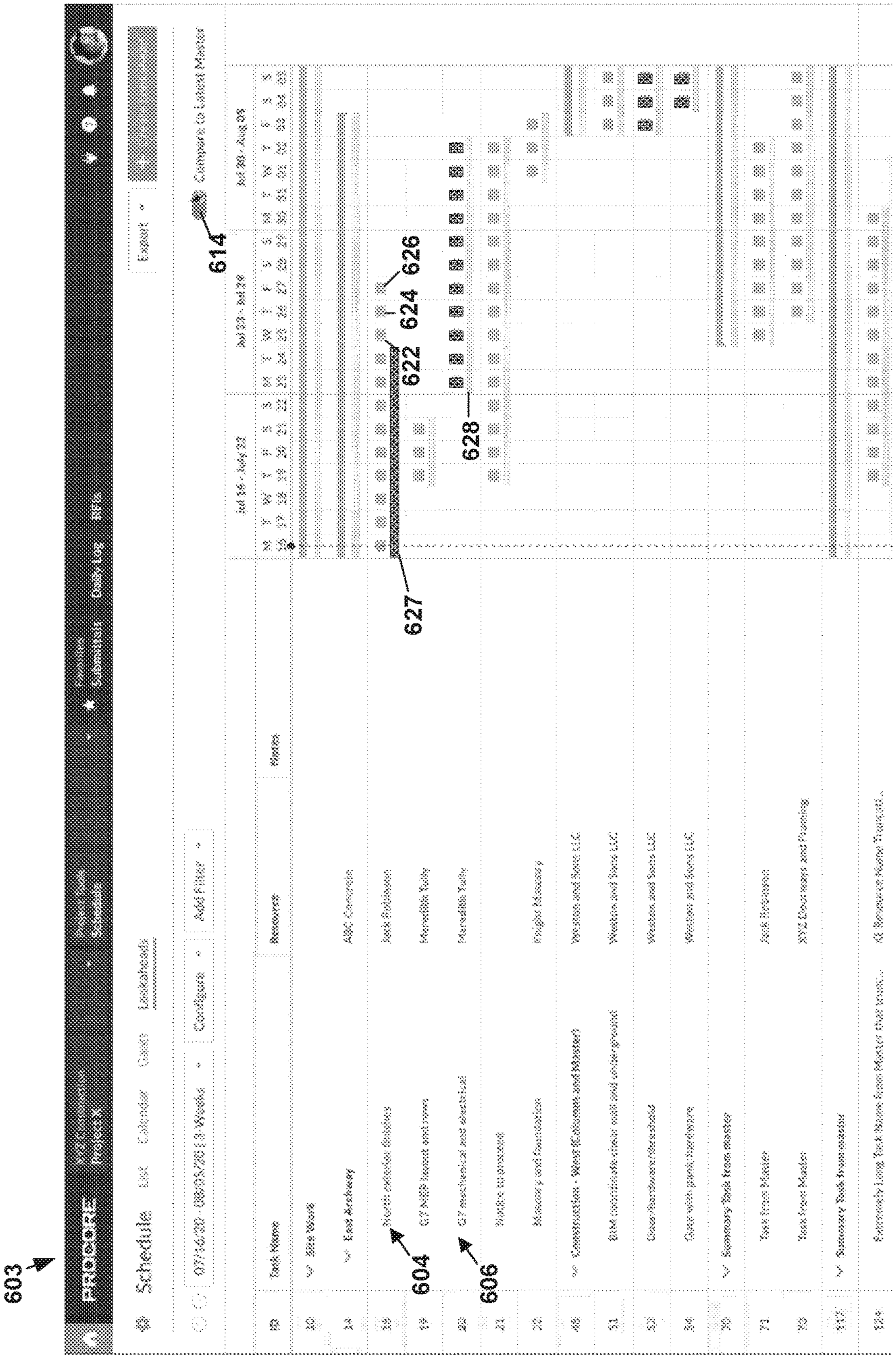
FIG. 6D depicts still another example view of a lookahead schedule in accordance with the present disclosure.

As one example to illustrate, after the user toggles compare button 614 in view 602 of FIG. 6C, view 602 may transition to user-interface view 603 shown in FIG. 6D. As shown in FIG. 6D, view 603 includes an indication that compare button 614 has been toggled to compare the initial lookahead schedule to the previously-created master schedule.

View 603 may also include an indication of any differences between the initial lookahead schedule to the previously-created master schedule. For instance, for each task or subtask included in the initial lookahead schedule, view 603 may include a progress bar from the previously-created master schedule that visually indicates the planned start date and the planned finish date included in the previously-created master schedule for the task or subtask and/or visually indicates how much progress has been made for the task or subtask. This progress bar may enable the user to visually compare the planned start and finish dates for the task or subtask included in the initial lookahead schedule to the planned start and finish dates for the task or subtask included in the previously-created master schedule and/or visually compare how much progress has been made in completing the task or subtask.

In one particular example, with respect to subtask 604, progress bar 627 visually indicates the planned start date and the planned finish date included in the previously-created master schedule for subtask 604. As shown, progress bar 627 indicates that the planned finish date included in the previously-created master schedule for subtask 604 is July 24, whereas the planned finish date included in the initial lookahead schedule for subtask 604 is July 27 (i.e., 3 additional days than the planned finish date indicated by progress bar 627, as indicated by squares 622-626). To indicate that the duration to complete subtask 604 included in the previously-created master schedule is different than the duration to complete subtask 604 included in the initial lookahead schedule, progress bar 627 may also include a shading and/or color that indicates there is a difference.

As another particular example, with respect to subtask 606, progress bar 628 visually indicates the planned start date and the planned finish date included in the previously-created master schedule for subtask 606. As shown, progress bar 628 indicates that the planned finish date included in the previously-created master schedule for subtask 606 is August 2, which is the same as the planned finish date included in the initial lookahead schedule for subtask 604, as indicated by squares directly above progress bar 628. To indicate that the duration to complete subtask 606 included in the previously-created master schedule is the same as the duration to complete subtask 606 included in the initial lookahead schedule, progress bar 628 may also include a shading and/or color that indicates there is no difference between the two durations. In this respect, the shading and/or color of progress bar 628 may be different than the shading and/or color of progress bar 627.

The user-interface view (e.g., view 603) that represents the comparison between the initial lookahead schedule and the previously-created master schedule may take various other forms as well.

In practice, the user may wish to compare the initial lookahead schedule to the previously-created master schedule for various reasons. For instance, the user may wish to compare the initial lookahead schedule to the previously-created master schedule to update the previously-created master schedule and ensure that the previously-created master schedule is in sync with the initial lookahead schedule. The updated master schedule may then be used to assess how future tasks included in the previously-created master schedule (e.g., critical path tasks) may be impacted and enable a project manager for the construction project to plan accordingly to ensure that the project can still be completed on time and on budget.

Generally speaking, the previously-created master schedule may be updated in various manners.

As one possibility, as noted above, the example construction management software application may provide a tool that facilitates creation and management of a master schedule (e.g., the master schedule shown in view 300 of FIG. 3). While comparing the initial lookahead schedule to the master schedule, a user (which may be the same individual that requested to create the initial lookahead schedule or a different individual that may be employed by the GC or a given SC) may access this tool that facilitates creation and management of the master schedule and then manually update the master schedule based on any difference between the master schedule and the initial lookahead schedule.

As another possibility, while accessing view 603 of FIG. 6D to compare the initial lookahead schedule to the previously-created master schedule (or any other tool provided by the construction management software application), back-end platform 102 may detect a difference between the initial lookahead schedule and the previously-created master schedule and cause the user's client station to present a prompt asking if the user wishes to update the previously-created master schedule. The user may then input an indication to update the previously-created master schedule in accordance with the initial lookahead schedule, which may trigger back-end platform 102 to update the previously-created master schedule or send a message to another client station (e.g., client station 114) associated with another user to approve the request to update the previously-created master schedule.

As yet another possibility, the example construction management software application may provide a tool that facilitates creation and management of a master schedule (e.g., the master schedule shown in view 300 of FIG. 3). The user may access this tool that facilitates creation and management of the master schedule and then input an indication to update the master schedule (e.g., by selecting a control button). Back-end platform 102 may then automatically update the master schedule based on the input.

The previously-created master schedule may be updated in various other manners as well.

As the construction project progresses, a user (which may be the same individual that requested to create the initial lookahead schedule or a different individual that may be employed by the GC or a given SC) may wish to create a subsequent lookahead schedule for the construction project that summarizes the upcoming weeks (e.g., the upcoming 1 to 4 weeks) of the construction project and provides granular-level tasks that need to be completed by construction workers on a day-to-day basis for one or more upcoming weeks. The example construction management software application may facilitate the creation of a subsequent lookahead schedule. For instance, the example construction management software application may initiate the second workflow for creating a subsequent lookahead schedule. The second workflow may take various forms and may be carried out in various manners.

Figure 7:
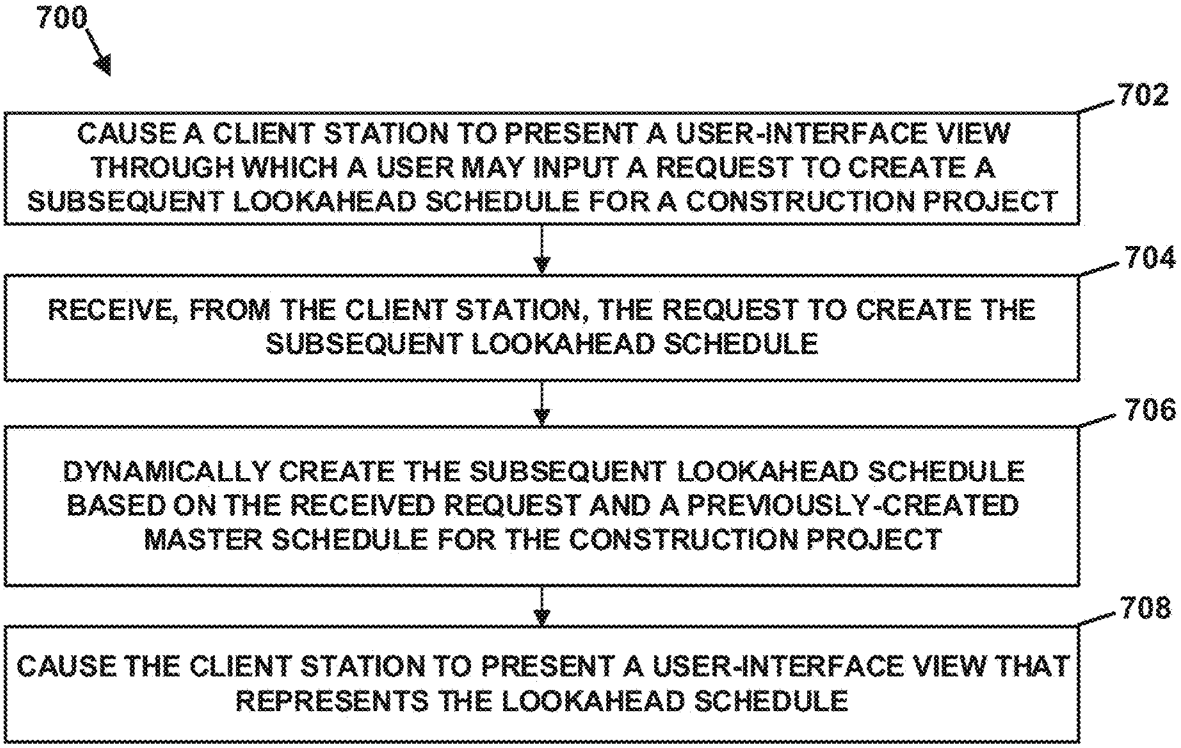
FIG. 7 depicts an example flow diagram for the second workflow of the disclosed software application in accordance with the present disclosure.

One possible example of the second workflow will now be described with reference to FIG. 7. For the purposes of illustration only, the example functions involved in the example second workflow are described as being carried out by a back-end platform (e.g., back-end platform 102). However, it is possible that the responsibility for carrying out these example functions could be distributed between a back-end platform (e.g., back-end platform 102) and one or more client stations (e.g., client stations 112, 114, and/or 116). Further, it should be understood that example flow diagram 700 shown in FIG. 7 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the second workflow may involve a user (e.g., an individual associated with a GC, such as a project manager employed by the GC or an employee of a SC) requesting access to a tool that facilitates the creation of a subsequent lookahead schedule by, for example, launching a native application on a client station associated with the user or directing a web browser on the client station associated with the user to a uniform resource locator (URL) for the construction management software application, either of which may cause the user's client station (e.g., client station 112) to send a request to back-end platform 102 to access the tool.

At block 702, back-end platform 102 may then cause the user's client station (e.g., client station 112) to present a user-interface view through which the user may input a request to create a subsequent lookahead schedule for the construction project. The request that may be input by the user may take various forms.

As one possibility, the request to create the subsequent lookahead schedule may comprise timeline information for the subsequent lookahead schedule that defines the timeline for the subsequent lookahead schedule. The timeline information may include a start date for the subsequent lookahead schedule and a duration for the subsequent lookahead schedule (e.g., the upcoming 1-2 weeks).

As another possibility, the request to create the subsequent lookahead schedule may comprise information about a previous lookahead schedule (e.g., the initial lookahead schedule described above) for the construction project. The information about the previous lookahead schedule may include any information that identifies the previous lookahead schedule, such as the data records included as part of the previous lookahead schedule.

The request that may be input by the user may take various other forms as well.

Figure 8:
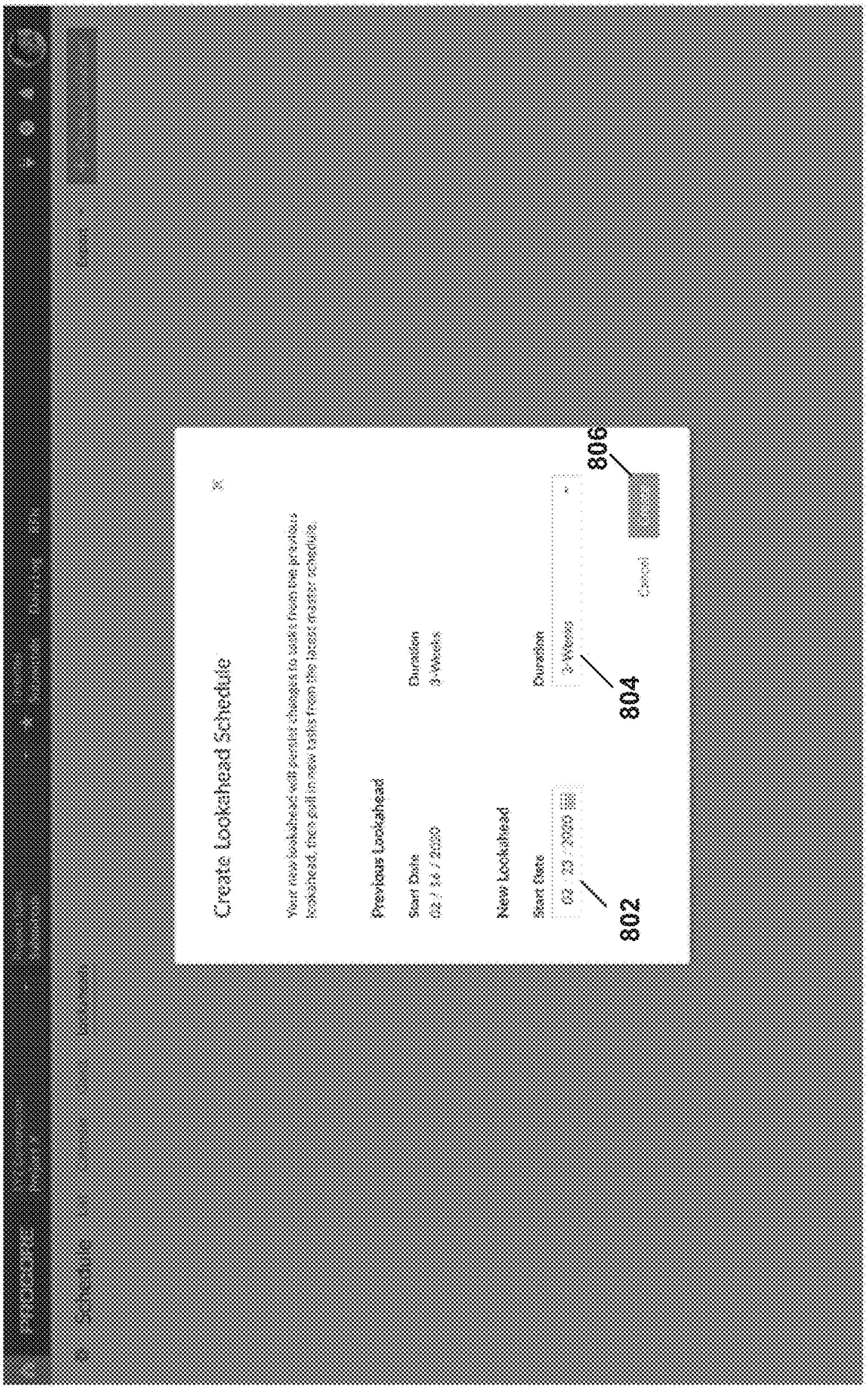
FIG. 8 depicts an example view of the disclosed software application that may be presented to a client station to create a subsequent lookahead schedule in accordance with the present disclosure.

Further, the request that may be input by the user to create the subsequent lookahead schedule may be inputted by the user in various manners. To illustrate, FIG. 8 depicts an example user-interface view 800 that may facilitate the creation of the subsequent lookahead schedule. As shown, view 800 includes data fields to input timing information that defines the timeline for the subsequent lookahead schedule. For instance, view 800 includes data field 802 to input a start date for subsequent lookahead schedule (e.g., "Feb. 23, 2020"), which may be inputted by either typing in the start date in data field 802 or inputting the start date by selecting a date from a calendar that may be accessed by selecting the calendar icon in data field 802. View 800 may also include data field 804 to input a duration for the subsequent lookahead schedule (e.g., the upcoming 3 weeks starting from "Feb. 23, 2020"), which may be inputted by selecting the duration from a drop-down menu in data field 804.

As further shown in FIG. 8, view 800 may include information about a previous lookahead schedule for the construction project. For instance, view 800 may include an indication that a previous lookahead schedule with a start date of "Feb. 16, 2020" and a duration of "3 weeks" has been selected to facilitate the creation of the subsequent lookahead schedule. It should be understood that in some instances, the user may modify the information about the previous lookahead schedule to select a different lookahead schedule that has been previously created.

The request that may be input by the user to create the initial lookahead schedule may be inputted by the user in various other manners as well.

At block 704, back-end platform 102 may then receive, from the user's client station (e.g., client station 112), the request to create the subsequent lookahead schedule. Back-end platform 102 may receive the request at various times similar to the manners described above with reference to block 404.

At block 706, back-end platform 102 may then dynamically create the subsequent lookahead schedule based on the received request and a previously-created master schedule for the construction project. In this respect, the function of dynamically creating the subsequent lookahead schedule may take various forms.

In one implementation, the function of dynamically creating the subsequent lookahead schedule may involve identifying tasks (and/or subtasks) included in a previously-created master schedule (e.g., the master schedule depicted in view 300 of FIG. 3) that meet the timeline information (e.g., the start date and the duration) for the subsequent lookahead schedule included in the received request, and then copying the identified tasks (and/or subtasks) into the subsequent lookahead schedule being created. The function of dynamically creating the subsequent lookahead schedule may then involve comparing the unique identifiers of the tasks (and/or subtasks) included in the past lookahead schedule (e.g., the initial lookahead schedule) to the unique identifiers of the tasks (and/or subtasks) included in the previously-created master schedule to identify any task (and/or subtask) in the past lookahead schedule that (1) has not been completed, (2) does not match any of the tasks (and/or subtasks) included in the previously-created master schedule, and (3) meets the timeline information (e.g., the start date and the duration) for the subsequent lookahead schedule included in the received request. In turn, the function of dynamically creating the subsequent lookahead schedule may involve copying the identified tasks (and/or subtasks) from the past lookahead schedule into the subsequent lookahead schedule being created.

In another implementation, the function of dynamically creating the subsequent lookahead schedule may involve identifying tasks (and/or subtasks) in the past lookahead schedule (e.g., the initial lookahead schedule) that have not been completed, and then copying the identified tasks (and/or subtasks) into the subsequent lookahead schedule being created. The function of dynamically creating the subsequent lookahead schedule may then involve comparing the unique identifiers of the tasks (and/or subtasks) copied to the subsequent lookahead schedule from the past lookahead schedule to the unique identifiers of the tasks (and/or subtasks) included in the previously-created master schedule (e.g., the master schedule depicted in view 300 of FIG. 3) to identify any task (and/or subtask) in the previously-created master schedule that (1) does not match the tasks (and/or subtasks) copied to the subsequent lookahead schedule from the past lookahead schedule, and (2) meets the timeline information (e.g., the start date and the duration) for the subsequent lookahead schedule included in the received request. In turn, the function of dynamically creating the subsequent lookahead schedule may involve copying the identified tasks (and/or subtasks) from the previously-created master schedule into the subsequent lookahead schedule being created.

In practice, copying identified tasks (and/or subtasks) may involve accessing the respective data records that represent the identified tasks (and/or subtasks), creating a copy of the respective data records, and then including a reference to the newly-copied data records within a data structure that includes a unique identifier for the subsequent lookahead schedule and a list of data record identifiers, where each data record identifier identifies a respective data record included in the subsequent lookahead schedule. As noted above, a respective data record for a given task (or subtask) may comprise a unique identifier for the task (or subtask) as well as data fields that define the task (or subtask), such as a name of the task (or subtask), a planned started date, a planned finish date, a resource assigned to the task (or subtask), a duration to complete the task (or subtask), and/or an indication of how much progress has been made in completing the task (or subtask), among other possible data fields that may further define the task (or subtask).

The function of dynamically creating the subsequent lookahead schedule may take various other forms as well.

In turn, at block 708, back-end platform 102 may cause the user's client station (e.g., client station 112) to present a user-interface view that represents the subsequent lookahead schedule. The user-interface view that represents the subsequent lookahead schedule may take various forms similar to the user-interface view that represents the initial lookahead schedule described above (e.g., view 600 of FIG. 6A).

After the subsequent lookahead schedule has been created, the user-interface view that represents the subsequent lookahead schedule may enable a user to interact with the subsequent lookahead schedule in various manners similar to the manners described above with respect to the initial lookahead schedule. Generally speaking, any user of the example construction software application may interact with the subsequent lookahead schedule, which may include any individual employed by the GC that has an account to access the example construction software application, or any individual employed by a SC that has an account to access the example construction software application and has the GC's permission to access the subsequent lookahead schedule and/or modify some aspect of the subsequent lookahead schedule.

Further, after the subsequent lookahead schedule has been created, the user-interface view that represents the subsequent lookahead schedule may enable a user to compare the subsequent lookahead schedule to the previously-created master schedule for the construction project in similar manners described above with respect to the initial lookahead schedule.

As the construction project progresses, a user (which may be the same individual that requested to create the initial or subsequent lookahead schedule or a different individual that may be employed by the GC or a given SC) may wish to create yet another lookahead schedule for the construction project that summarizes the upcoming weeks (e.g., the upcoming 1 to 4 weeks) of the construction project and provides granular-level tasks that need to be completed by construction workers on a day-to-day basis for one or more upcoming weeks. In this respect, the example construction management software application may initiate the second workflow again to create a new subsequent lookahead schedule.

Accordingly, the disclosed software technology for creating and managing a lookahead schedule for a construction project may provide several advantages. As one example, the disclosed software technology may automate the creation of lookahead schedules for a construction project, which is more efficient, less cumbersome, and less susceptible to errors than manually inputting information that defines a lookahead schedule via a "spreadsheet-style" user interface provided by existing software applications.

As another example, the disclosed software technology, which may be embodied in a construction management software application, may enable a user to manage both a master schedule and a given lookahead schedule, and thus any updates to one schedule and may be easily propagated to the other schedule.

As yet another example, the disclosed software technology, which may be embodied in a construction management software application, may enable a user to visually compare a master schedule to a given lookahead schedule in a user-interface view, and thus enable the user to update the master schedule more efficiently than existing software applications. In some instances, the disclosed software technology may automate this process of updating the master schedule based on the current lookahead schedule, which may be even more efficient and less cumbersome.

As a further example, the disclosed software technology, which may be embodied in a construction management software application, may provide a user-friendly interface that enables a user (e.g., a construction worker employed by the GC) to easily interact with a lookahead schedule to manage and track the progress of tasks and subtasks for a construction project, and/or to navigate to different workflows that may facilitate performing a given task or subtask (e.g., a workflow for obtaining approval of certain equipment and/or materials that may be needed to perform a given task included in the initial lookahead schedule).

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," "individuals," or other entities, this is for purposes of example and explanation only. The claims should not be construed as requiring action by such actors unless explicitly recited in the claim language.

The invention claimed is:

1. A computing system comprising:

at least one non-transitory computer-readable medium;

at least one processor; and program instructions stored on the at least one non-transitory computer-readable medium that, when executed by the at least one processor, cause the computing system to:

receive, from a first client station, (i) a first request to create a lookahead schedule for a construction project and (ii) timeline information for the lookahead schedule;

based on (i) the first request and (ii) a master schedule for the construction project comprising a set of master-schedule tasks, create the lookahead schedule that comprises a set of tasks that are, based on the timeline information, selected from the set of master-schedule tasks;

cause a second client station to present a graphical user interface (GUI) that provides a representation of the created lookahead schedule;

receive, from the second client station, a second request to modify the lookahead schedule, wherein the second request is based on a user request to edit a given task of the set of tasks that is entered via the GUI;

after receiving the second request, edit a data record for the given task to thereby modify the lookahead schedule to a modified lookahead schedule; and cause the second client station to present an updated GUI that provides a representation of the modified lookahead schedule along with a visualization of one or more differences between the modified lookahead schedule and the master schedule, the representation comprising (i) a first visual representation of schedule information for the given task that is based on a data record of the given task in the master schedule and (ii) a second visual representation for the given task that is based on the edited data record for the given task in the modified lookahead schedule, wherein the first visual representation differs from the second visual representation.

2. The computing system of claim 1, wherein the program instructions that, when executed by the at least one processor, cause the computing system to create the lookahead schedule comprise program instructions that, when executed by the at least one processor, cause the computing system to:

identify a subset of the set of master-schedule tasks from the master schedule that each fall within a timeline defined by the timeline information; and copy the identified subset of master-schedule tasks into the lookahead schedule.

3. The computing system of claim 1, wherein the program instructions that, when executed by the at least one processor, cause the computing system to edit the data record for the given task comprise program instructions that, when executed by the at least one processor, cause the computing system to:

based on the user request to edit the given task, identify the data record for the given task; and modify the data record for the given task.

4. The computing system of claim 1, wherein the user request to edit the given task of the set of tasks comprises a user request to modify a duration of the given task, and wherein the program instructions that, when executed by the at least one processor, cause the computing system to edit the data record for the given task comprise program instructions that, when executed by the at least one processor, cause the computing system to:

based on the user request to edit the given task, identify the data record for the given task; and modify the data record for the given task by editing a data field for the duration of the given task based on the user request to modify the duration of the given task.

5. The computing system of claim 1, further comprising program instructions that, when executed by the at least one processor, cause the computing system to:

before causing the second client station to present the updated GUI that provides the representation of the modified lookahead schedule along with the visualization of one or more differences between the modified lookahead schedule and the master schedule, identify differences in data fields of the data record for the given task in the master schedule and data fields of the edited data record for the given task in the modified lookahead schedule.

6. The computing system of claim 1, wherein the timeline information comprises a start date for the lookahead schedule and a duration for the lookahead schedule.

7. A non-transitory computer-readable medium, wherein the non-transitory computer-readable medium is provisioned with program instructions that, when executed by at least one processor, cause a computing system to:

receive, from a first client station, (i) a first request to create a lookahead schedule for a construction project and (ii) timeline information for the lookahead schedule;

based on (i) the first request and (ii) a master schedule for the construction project comprising a set of master-schedule tasks, create the lookahead schedule that comprises a set of tasks that are, based on the timeline information, selected from the set of master-schedule tasks;

cause a second client station to present a graphical user interface (GUI) that provides a representation of the created lookahead schedule;

receive, from the second client station, a second request to modify the lookahead schedule, wherein the second request is based on a user request to edit a given task of the set of tasks that is entered via the GUI;

after receiving the second request, edit a data record for the given task to thereby modify the lookahead schedule to a modified lookahead schedule; and cause the second client station to present an updated GUI that provides a representation of the modified lookahead schedule along with a visualization of one or more differences between the modified lookahead schedule and the master schedule, the representation comprising (i) a first visual representation of schedule information for the given task that is based on a data record of the given task in the master schedule and (ii) a second visual representation for the given task that is based on the edited data record for the given task in the modified lookahead schedule, wherein the first visual representation differs from the second visual representation.

8. The non-transitory computer-readable medium of claim 7, wherein the program instructions that, when executed by the at least one processor, cause the computing system to create the lookahead schedule comprise program instructions that, when executed by the at least one processor, cause the computing system to:

identify a subset of the set of master-schedule tasks from the master schedule, that each fall within a timeline defined by the timeline information; and copy the identified subset of master-schedule tasks into the lookahead schedule.

9. The non-transitory computer-readable medium of claim 7, wherein the program instructions that, when executed by the at least one processor, cause the computing system to edit the data record for the given task comprise program instructions that, when executed by the at least one processor, cause the computing system to:

based on the user request to edit the given task, identify the data record for the given task; and modify the data record for the given task.

10. The non-transitory computer-readable medium of claim 7, wherein the user request to edit the given task of the set of tasks comprises a user request to modify a duration of the given task, and wherein the program instructions that, when executed by the at least one processor, cause the computing system to edit the data record for the given task comprise program instructions that, when executed by the at least one processor, cause the computing system to:

based on the user request to edit the given task, identify the data record for the given task; and modify the data record for the given task by editing a data field for the duration of the given task based on the user request to modify the duration of the given task.

11. The non-transitory computer-readable medium of claim 7, further comprising program instructions that, when executed by the at least one processor, cause the computing system to:

before causing the second client station to present the updated GUI that provides the representation of the modified lookahead schedule along with the visualization of one or more differences between the modified lookahead schedule and the master schedule, identify differences in data fields of the data record for the given task in the master schedule and data fields of the edited data record for the given task in the modified lookahead schedule.

12. A method carried out by a computing system, the method comprising:

receiving, from a first client station, (i) a first request to create a lookahead schedule for a construction project and (ii) timeline information for the lookahead schedule;

based on (i) the first request and (ii) a master schedule for the construction project comprising a set of master-schedule tasks, creating the lookahead schedule that comprises a set of tasks that are, based on the timeline information, selected from the set of master-schedule tasks;

causing a second client station to present a graphical user interface (GUI) that provides a representation of the created lookahead schedule;

receiving, from the second client station, a second request to modify the lookahead schedule, wherein the second request is based on a user request to edit a given task of the set of tasks that is entered via the GUI;

after receiving the second request, editing a data record for the given task to thereby modify the lookahead schedule to a modified lookahead schedule; and causing the second client station to present an updated GUI that provides a representation of the modified lookahead schedule along with a visualization of one or more differences between the modified lookahead schedule and the master schedule, the representation comprising (i) a first visual representation of schedule information for the given task that is based on a data record of the given task in the master schedule and (ii) a second visual representation for the given task that is based on the edited data record for the given task in the modified lookahead schedule, wherein the first visual representation differs from the second visual representation.

13. The method of claim 12, wherein creating the lookahead schedule comprises:

identifying a subset of the set of master-schedule tasks from the master schedule that each fall within a timeline defined by the timeline information; and copying the identified subset of master-schedule tasks into the lookahead schedule.

14. The method of claim 12, wherein editing the data record for the given task comprises:

based on the user request to edit the given task, identifying the data record for the given task; and modifying the data record for the given task.

15. The method of claim 12, wherein the user request to edit the given task of the set of tasks comprises a user request to modify a duration of the given task, and wherein editing the data record for the given task comprises:

based on the user request to edit the given task, identifying the data record for the given task; and modifying the data record for the given task by editing a data field for the duration of the given task based on the user request to modify the duration of the given task.

16. The computing system of claim 1, wherein the first client station comprises the second client station.

17. The non-transitory computer-readable medium of claim 7, wherein the first client station comprises the second client station.

18. The method of claim 12, wherein the first client station comprises the second client station.

19. The computing system of claim 1, wherein the first visual representation differing from the second visual representation comprises one or more of (i) the first visual representation having a first color that differs from a second color of the second visual representation, (ii) the first visual representation having a first shading that differs from a second shading of the second visual representation, (iii) the first visual representation having a first pattern that differs from a second pattern of the second visual representation, or (iv) the first visual representation having a first shape that differs from a second shape of the second visual representation.

20. The computing system of claim 1, wherein the user request to edit the given task of the set of tasks comprises a first user request, and wherein the second client station is caused to present the updated GUI based on a second user request to compare the modified lookahead schedule to the master schedule that is entered via the GUI.

* * * * *